US012739334B2

(12) United States Patent
Arakaki et al.

(10) Patent No.: US 12,739,334 B2
(45) Date of Patent: Sep. 15, 2026

(54) ELECTRONIC DEVICE, METHOD FOR CONTROLLING ELECTRONIC DEVICE, AND RECORDING MEDIUM

(71) Applicant: CANON KABUSHIKI KAISHA, Tokyo (JP)

(72) Inventors: Ryohei Arakaki, Tokyo (JP); Yoshiyuki Hirai, Tokyo (JP); Nao Saito, Kanagawa (JP); Tsuyoshi Tajima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 224 days.

(21) Appl. No.: 18/830,954

(22) Filed: Sep. 11, 2024

(65) Prior Publication Data

US 2025/0097360 A1 Mar. 20, 2025

(30) Foreign Application Priority Data

Sep. 14, 2023 (JP) ................................ 2023-149260
Sep. 14, 2023 (JP) ................................ 2023-149261

(51) Int. Cl.
*H04N 1/00* (2006.01)
*G06F 8/65* (2018.01)

(52) U.S. Cl.
CPC .......... *H04N 1/00925* (2013.01); *G06F 8/65* (2013.01); *H04N 2201/3246* (2013.01)

(58) Field of Classification Search
None
See application file for complete search history.

(56) References Cited

U.S. PATENT DOCUMENTS 10,908,849 B2 * 2/2021 Pettis .................... B33Y 50/00
2007/0229873 A1 * 10/2007 Kato .................... G06F 21/608 358/1.14

(Continued)

FOREIGN PATENT DOCUMENTS

JP 2016162063 A 9/2016
JP 2020019238 A 2/2020

(Continued)

*Primary Examiner* — Haris Sabah
(74) *Attorney, Agent, or Firm* — Canon U.S.A., Inc. IP Division

(57) ABSTRACT

To enable processing related to user permission, to be performed appropriately. An electronic device includes a processing unit configured to perform processing in such a manner that a permission state indicating whether an operation representing user agreement with a permission matter regarding transmission of information from the electronic device to a transmission destination has been received is stored, an acquisition unit configured to acquire first information indicating whether the permission matter that corresponds to a region of the electronic device has been updated, and a control unit configured to, in a case where update about the permission matter has not been executed, perform control to transmit information to the transmission destination without displaying a reception screen for receiving agreement with the permission matter from a user, and in a case where update about the permission matter has been executed, perform control to display the reception screen.

30 Claims, 10 Drawing Sheets

EXAMPLE OF SERVICE PERMISSION MESSAGE

REQUEST IN USING VARIOUS SERVICES
IN ORDER TO PROVIDE PRINTER-RELATED SERVICES TO OUR CUSTOMERS, COMPANY C (OUR COMPANY) REQUESTS THAT CUSTOMERS TRANSMIT INFORMATION REGARDING THEIR COMPANY C PRODUCTS VIA INTERNET TO SERVERS OF DOMESTIC RESEARCH COMPANIES WITH LEGITIMATE LICENSES THAT ARE MANAGED BY COMPANY C (OR TO RESEARCH COMPANIES WITH LEGITIMATE LICENSES IN CASE WHERE YOU ARE USING COMPANY C PRODUCTS WITHIN THE COUNTRY). REFER TO ATTACHED MANUAL "TRANSMISSION OF INFORMATION TO COMPANY C" FOR DETAILS SUCH AS INFORMATION TO BE TRANSMITTED, AND SELECT WHETHER OR NOT TO GRANT PERMISSION FOR TRANSMISSION OF INFORMATION REGARDING SERVICE USE.

EXAMPLE OF ANALYSIS PERMISSION MESSAGE

REQUEST IN USING PRINTERS MANUFACTURED BY COMPANY C
IN ORDER TO PLAN AND DEVELOP BETTER PRODUCTS AND SERVICES THAT MEET NEEDS OF OUR CUSTOMERS, COMPANY C (OUR COMPANY) REQUESTS THAT CUSTOMERS TRANSMIT INFORMATION REGARDING THEIR COMPANY C PRODUCTS VIA INTERNET TO SERVERS OF DOMESTIC RESEARCH COMPANIES WITH LEGITIMATE LICENSES THAT ARE MANAGED BY COMPANY C (OR TO RESEARCH COMPANIES WITH LEGITIMATE LICENSES IN CASE WHERE YOU ARE USING COMPANY C PRODUCTS WITHIN THE COUNTRY). REFER TO ATTACHED MANUAL "TRANSMISSION OF INFORMATION TO COMPANY C" FOR DETAILS SUCH AS INFORMATION TO BE TRANSMITTED, AND SELECT WHETHER OR NOT TO GRANT PERMISSION FOR TRANSMISSION OF INFORMATION REGARDING USAGE STATUS OF PRINTER MANUFACTURED BY COMPANY C.

(56) References Cited

U.S. PATENT DOCUMENTS

| | | | | |
|---|---|---|---|---|
| 2011/0090535 | A1* | 4/2011 | Towata | G06F 3/1272 358/1.15 |
| 2012/0140285 | A1* | 6/2012 | Kamath | G06F 3/1204 358/1.15 |
| 2016/0125174 | A1* | 5/2016 | Matsushima | G06F 21/105 726/30 |
| 2020/0045204 | A1 | 2/2020 | Niimoto | |

FOREIGN PATENT DOCUMENTS

| | | | |
|---|---|---|---|
| JP | 2020022099 | A | 2/2020 |
| JP | 7134772 | B2 | 9/2022 |

* cited by examiner

FIG.2A

EXAMPLE OF SERVICE PERMISSION MESSAGE

REQUEST IN USING VARIOUS SERVICES
IN ORDER TO PROVIDE PRINTER-RELATED SERVICES TO OUR CUSTOMERS, COMPANY C (OUR COMPANY) REQUESTS THAT CUSTOMERS TRANSMIT INFORMATION REGARDING THEIR COMPANY C PRODUCTS VIA INTERNET TO SERVERS OF DOMESTIC RESEARCH COMPANIES WITH LEGITIMATE LICENSES THAT ARE MANAGED BY COMPANY C (OR TO RESEARCH COMPANIES WITH LEGITIMATE LICENSES IN CASE WHERE YOU ARE USING COMPANY C PRODUCTS WITHIN THE COUNTRY). REFER TO ATTACHED MANUAL "TRANSMISSION OF INFORMATION TO COMPANY C" FOR DETAILS SUCH AS INFORMATION TO BE TRANSMITTED, AND SELECT WHETHER OR NOT TO GRANT PERMISSION FOR TRANSMISSION OF INFORMATION REGARDING SERVICE USE.

FIG.2B

EXAMPLE OF ANALYSIS PERMISSION MESSAGE

REQUEST IN USING PRINTERS MANUFACTURED BY COMPANY C
IN ORDER TO PLAN AND DEVELOP BETTER PRODUCTS AND SERVICES THAT MEET NEEDS OF OUR CUSTOMERS, COMPANY C (OUR COMPANY) REQUESTS THAT CUSTOMERS TRANSMIT INFORMATION REGARDING THEIR COMPANY C PRODUCTS VIA INTERNET TO SERVERS OF DOMESTIC RESEARCH COMPANIES WITH LEGITIMATE LICENSES THAT ARE MANAGED BY COMPANY C (OR TO RESEARCH COMPANIES WITH LEGITIMATE LICENSES IN CASE WHERE YOU ARE USING COMPANY C PRODUCTS WITHIN THE COUNTRY). REFER TO ATTACHED MANUAL "TRANSMISSION OF INFORMATION TO COMPANY C" FOR DETAILS SUCH AS INFORMATION TO BE TRANSMITTED, AND SELECT WHETHER OR NOT TO GRANT PERMISSION FOR TRANSMISSION OF INFORMATION REGARDING USAGE STATUS OF PRINTER MANUFACTURED BY COMPANY C.

FIG.2C

EXAMPLE OF VERSION MANAGEMENT OF PERMISSION SET

| VERSION OF PERMISSION SET | 1 | 2 | 3 | ... |
|---|---|---|---|---|
| VERSION OF SERVICE PERMISSION MESSAGE | 1 | 2 | 2 | ... |
| VERSION OF ANALYSIS PERMISSION MESSAGE | 1 | 1 | 2 | ... |

FIG.2D

EXAMPLE OF LATEST REGION-BY-REGION VERSION MANAGEMENT STORED IN SERVER 103

| REGION | JAPAN | USA | CHINA | EUROPE | ... |
|---|---|---|---|---|---|
| LATEST VERSION OF PERMISSION SET | 1 | 2 | 1 | 3 | ... |

| SERVICE PERMISSION MESSAGE | UNPERMITTED (DEFAULT VALUE) |
|---|---|
| ANALYSIS PERMISSION MESSAGE | UNPERMITTED (DEFAULT VALUE) |
| PERMISSION MESSAGE VERSION | – (DEFAULT VALUE) |

| SERVICE PERMISSION MESSAGE | GRANTED (PERMITTED) |
|---|---|
| ANALYSIS PERMISSION MESSAGE | GRANTED (PERMITTED) |
| PERMISSION MESSAGE VERSION | PERMISSION SET 1 |

| SERVICE PERMISSION MESSAGE | GRANTED (PERMITTED) |
|---|---|
| ANALYSIS PERMISSION MESSAGE | GRANTED (PERMITTED) |
| PERMISSION MESSAGE VERSION | PERMISSION SET 2 |

| SERVICE PERMISSION MESSAGE | UNGRANTED (UNPERMITTED) |
|---|---|
| ANALYSIS PERMISSION MESSAGE | UNGRANTED (UNPERMITTED) |
| PERMISSION MESSAGE VERSION | – (DEFAULT VALUE) |

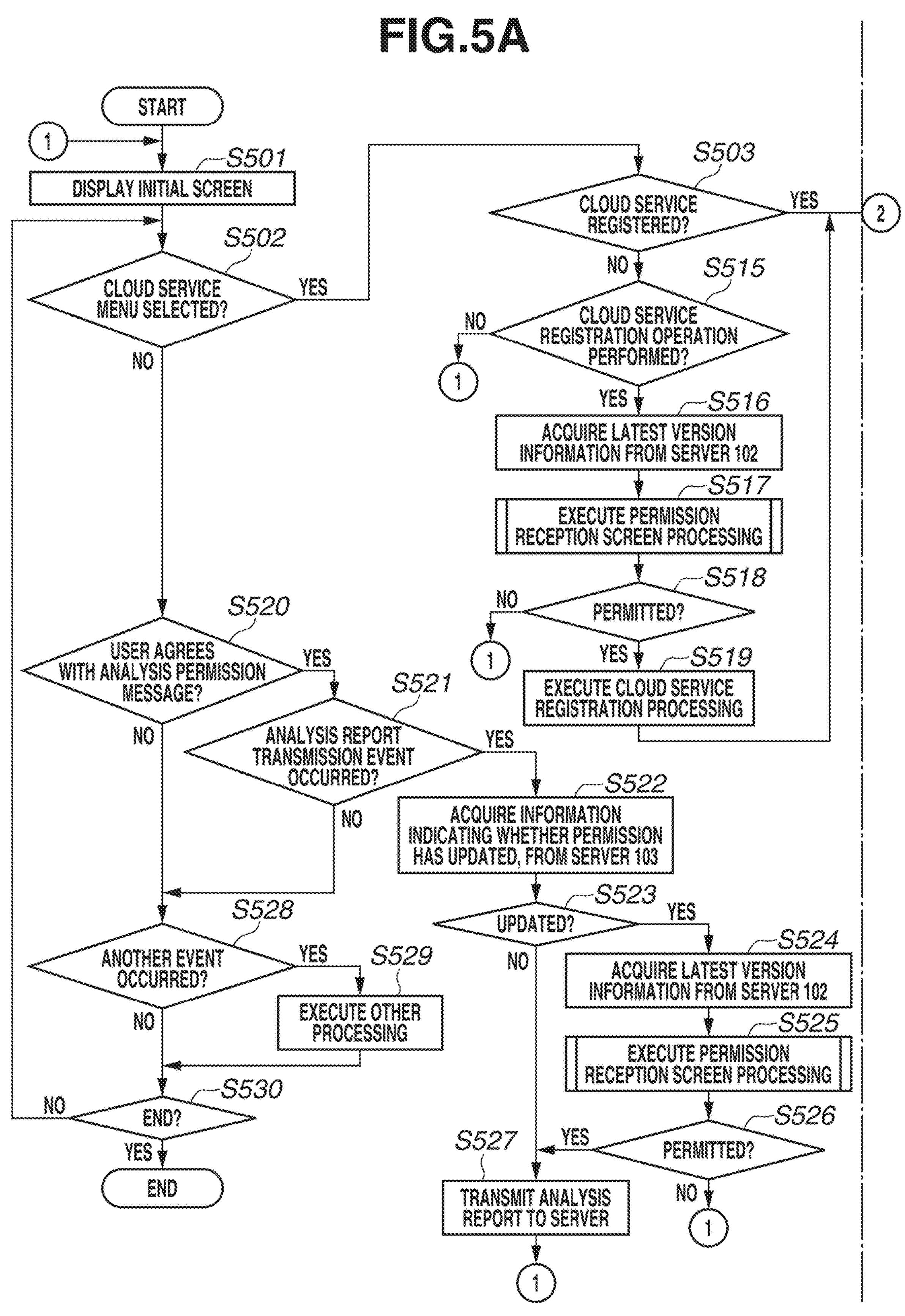
FIG.5A
START
1
S501
DISPLAY INITIAL SCREEN
S502
CLOUD SERVICE MENU SELECTED?
YES
NO
S503
CLOUD SERVICE REGISTERED?
YES
2
NO
S515
CLOUD SERVICE REGISTRATION OPERATION PERFORMED?
NO
1
YES
S516
ACQUIRE LATEST VERSION INFORMATION FROM SERVER 102
S517
EXECUTE PERMISSION RECEPTION SCREEN PROCESSING
S518
PERMITTED?
NO
1
YES
S519
EXECUTE CLOUD SERVICE REGISTRATION PROCESSING
S520
USER AGREES WITH ANALYSIS PERMISSION MESSAGE?
YES
NO
S521
ANALYSIS REPORT TRANSMISSION EVENT OCCURRED?
YES
NO
S522
ACQUIRE INFORMATION INDICATING WHETHER PERMISSION HAS UPDATED, FROM SERVER 103
S523
UPDATED?
YES
NO
S524
ACQUIRE LATEST VERSION INFORMATION FROM SERVER 102
S525
EXECUTE PERMISSION RECEPTION SCREEN PROCESSING
S526
PERMITTED?
YES
NO
1
S527
TRANSMIT ANALYSIS REPORT TO SERVER
1
S528
ANOTHER EVENT OCCURRED?
YES
NO
S529
EXECUTE OTHER PROCESSING
S530
END?
NO
YES
END

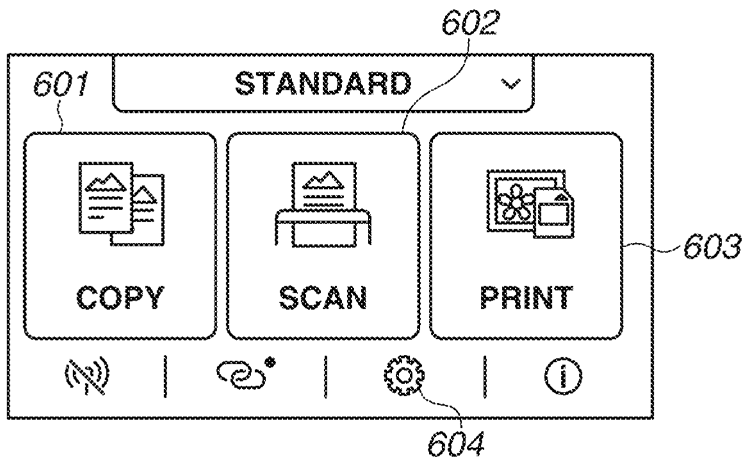
FIG.6A
INITIAL SCREEN
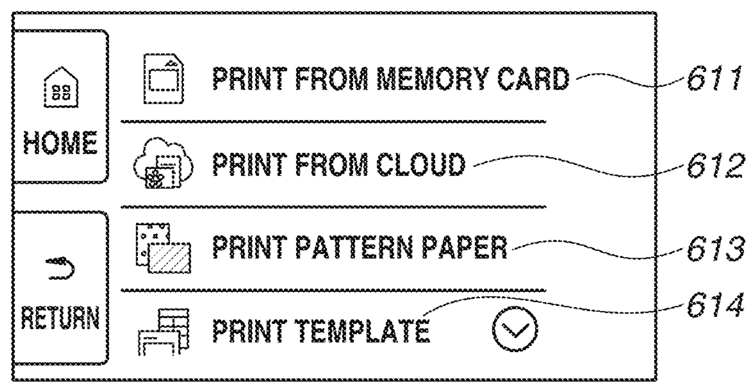
FIG.6B
PRINT SCREEN
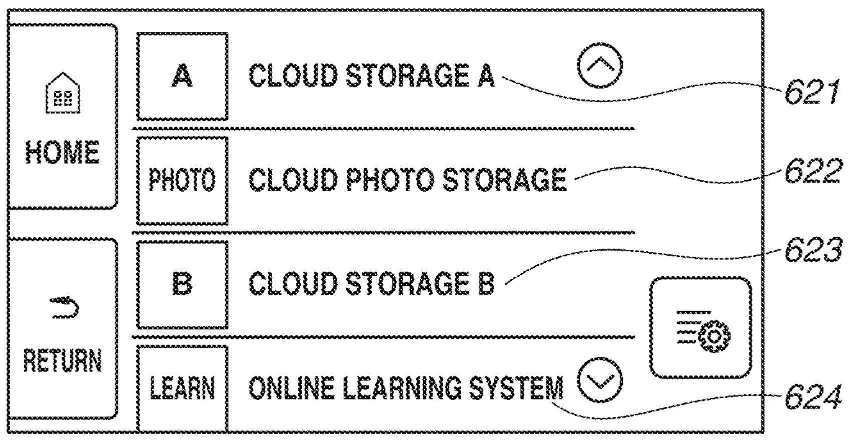
FIG.6C
CLOUD SERVICE LIST
FIG.6D
CHECK PERMISSION AGAIN BECAUSE PERMISSION TEXT HAS BEEN UPDATED.
NEXT

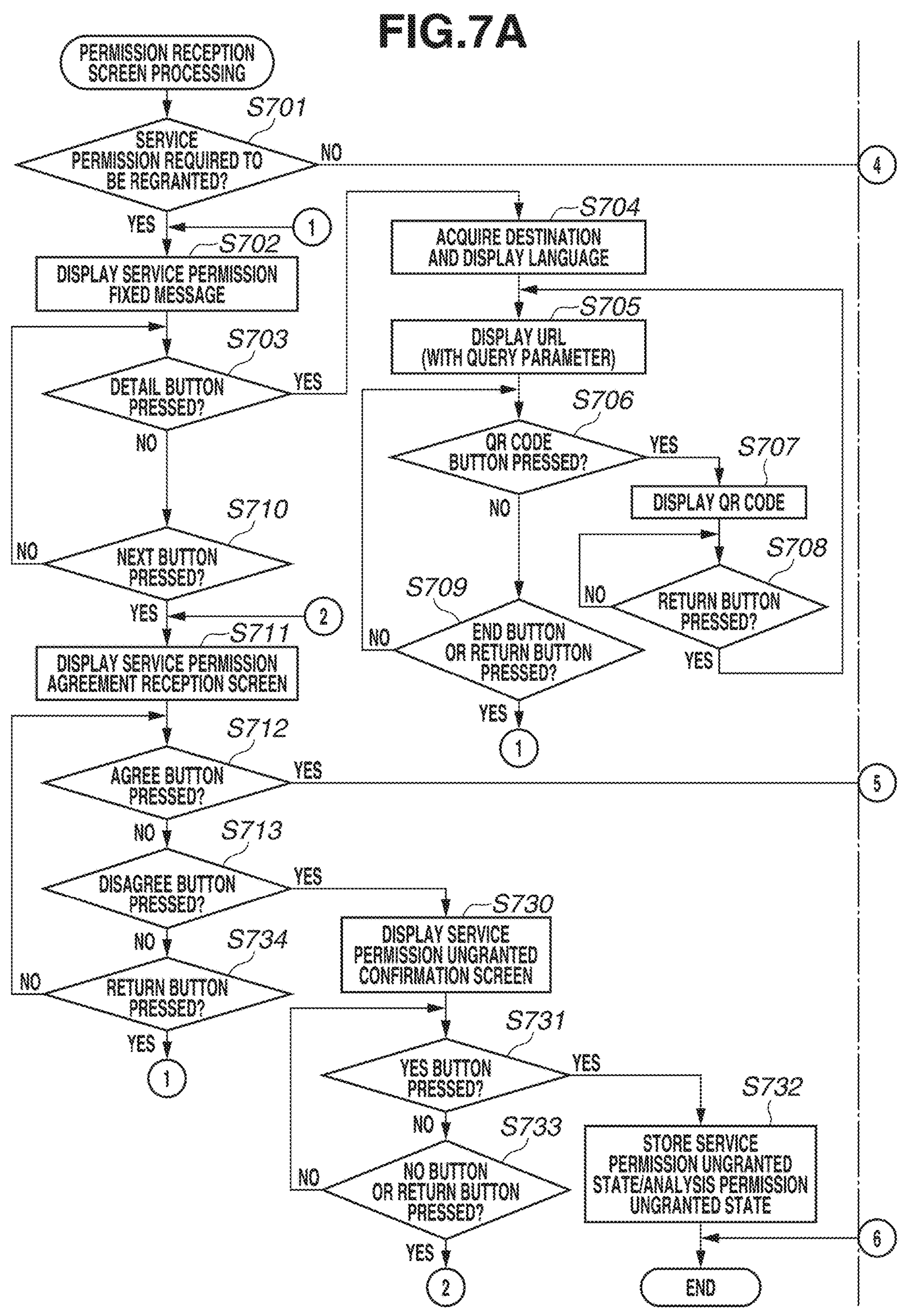
FIG.7A
PERMISSION RECEPTION SCREEN PROCESSING
S701
SERVICE PERMISSION REQUIRED TO BE REGRANTED?
NO
YES
4
1
S702
DISPLAY SERVICE PERMISSION FIXED MESSAGE
S703
DETAIL BUTTON PRESSED?
YES
NO
S704
ACQUIRE DESTINATION AND DISPLAY LANGUAGE
S705
DISPLAY URL (WITH QUERY PARAMETER)
S706
QR CODE BUTTON PRESSED?
YES
NO
S707
DISPLAY QR CODE
S708
RETURN BUTTON PRESSED?
NO
YES
S709
END BUTTON OR RETURN BUTTON PRESSED?
NO
YES
1
S710
NEXT BUTTON PRESSED?
NO
YES
2
S711
DISPLAY SERVICE PERMISSION AGREEMENT RECEPTION SCREEN
S712
AGREE BUTTON PRESSED?
YES
5
NO
S713
DISAGREE BUTTON PRESSED?
YES
NO
S730
DISPLAY SERVICE PERMISSION UNGRANTED CONFIRMATION SCREEN
S734
RETURN BUTTON PRESSED?
NO
YES
1
S731
YES BUTTON PRESSED?
YES
NO
S732
STORE SERVICE PERMISSION UNGRANTED STATE/ANALYSIS PERMISSION UNGRANTED STATE
S733
NO BUTTON OR RETURN BUTTON PRESSED?
NO
YES
2
6
END

FIG.8

ELECTRONIC DEVICE, METHOD FOR CONTROLLING ELECTRONIC DEVICE, AND RECORDING MEDIUM

BACKGROUND OF THE INVENTION

Field of the Invention

The present invention relates to an electronic device, a method for controlling an electronic device, and a recording medium.

Description of the Related Art

There has been conventionally known a system that provides a service suitable for the state of an electronic device by transmitting status information of the electronic device to a server based on user agreement, and the server analyzing the status information.

Japanese Patent No. 7134772 discusses a system that obtains agreement with permission for information transmission from a user of a multifunctional peripheral, transmits status information to a server, and uses the status information for a service.

Japanese Patent Application Laid-Open No. 2016-162063 discusses a system that reacquires permission for information transmission from a user due to the influence exerted by an added function in software update.

Matters (permission message) to be permitted by users might be changed by a change in law. Nevertheless, since laws differ from one country to another, if a country of which a law is to be applied to each electronic device cannot be identified, it is impossible to present appropriate matters to be permitted, to users.

If users are required to perform a user operation (e.g., selection of region or country) for presenting appropriate matters to be permitted, to users, users' works increase.

The handling of user information like status information of an electronic device sometimes changes. For example, in some cases, user information collection is regulated due to law amendment of each country. To avoid violating a law, a permission message of user information collection is to be updated, and a permission is to be obtained again from a user.

Nevertheless, in Japanese Patent No. 7134772, because a permission cannot be obtained again from a user even if only a permission message is updated, a legitimate operation might fail to be performed. In the system that reacquires a permission in software update as in Japanese Patent Application Laid-Open No. 2016-162063, in a case where software update is not performed, a legitimate operation might fail to be performed.

SUMMARY OF THE INVENTION

According to an aspect, the present disclosure is directed to enabling processing requiring user permission, to be performed more appropriately.

According to another aspect, the present disclosure is directed to enabling processing of acquiring user permission, to be performed more easily and appropriately.

According to an aspect of the present invention, An electronic device includes a processing unit configured to perform processing in such a manner that a permission state indicating whether an operation representing user agreement with a permission matter regarding transmission of information from the electronic device to a transmission destination has been received is stored in a storage unit, an acquisition unit configured to acquire first information indicating whether the permission matter that corresponds to a region of the electronic device and is to obtain agreement has been updated, from an external device, and a control unit configured to, based on an acquisition status in the acquisition unit, in a case where an acquisition status is not a status indicating that an update has been executed, perform control to transmit information to the transmission destination without displaying a reception screen for receiving agreement with the permission matter from a user after acquisition of the first information, and in a case where an acquisition status is a status indicating that update has been executed, perform control to display the reception screen for receiving agreement with the updated permission matter from a user after acquisition of the first information and before transmission of information to the transmission destination is performed.

Further features of the present invention will become apparent from the following description of embodiments with reference to the attached drawings.

BRIEF DESCRIPTION OF THE DRAWINGS

FIGS. 2A to 2D are diagrams illustrating an example of a permission message and an example of version management.

FIGS. 4A to 4D are diagrams each illustrating an example of information stored in the image processing apparatus.

FIGS. 5A and 5B are a flowchart illustrating a method for controlling the image processing apparatus.

FIGS. 6A to 6D are diagrams each illustrating a display screen example.

FIGS. 7A and 7B are a flowchart illustrating permission reception screen processing.

FIG. 8 is a diagram illustrating transition of a display screen.

DESCRIPTION OF THE EMBODIMENTS

Hereinafter, an embodiment of the present invention will be described with reference to the drawings. The components described in the present embodiment merely indicate examples of the present invention, and the scope of the present invention is not limited to these. Each of the embodiments of the present invention described below can be implemented solely or as a combination of a plurality of the embodiments or features thereof where necessary or where the combination of elements or features from individual embodiments in a single embodiment is beneficial.

Figure 1:
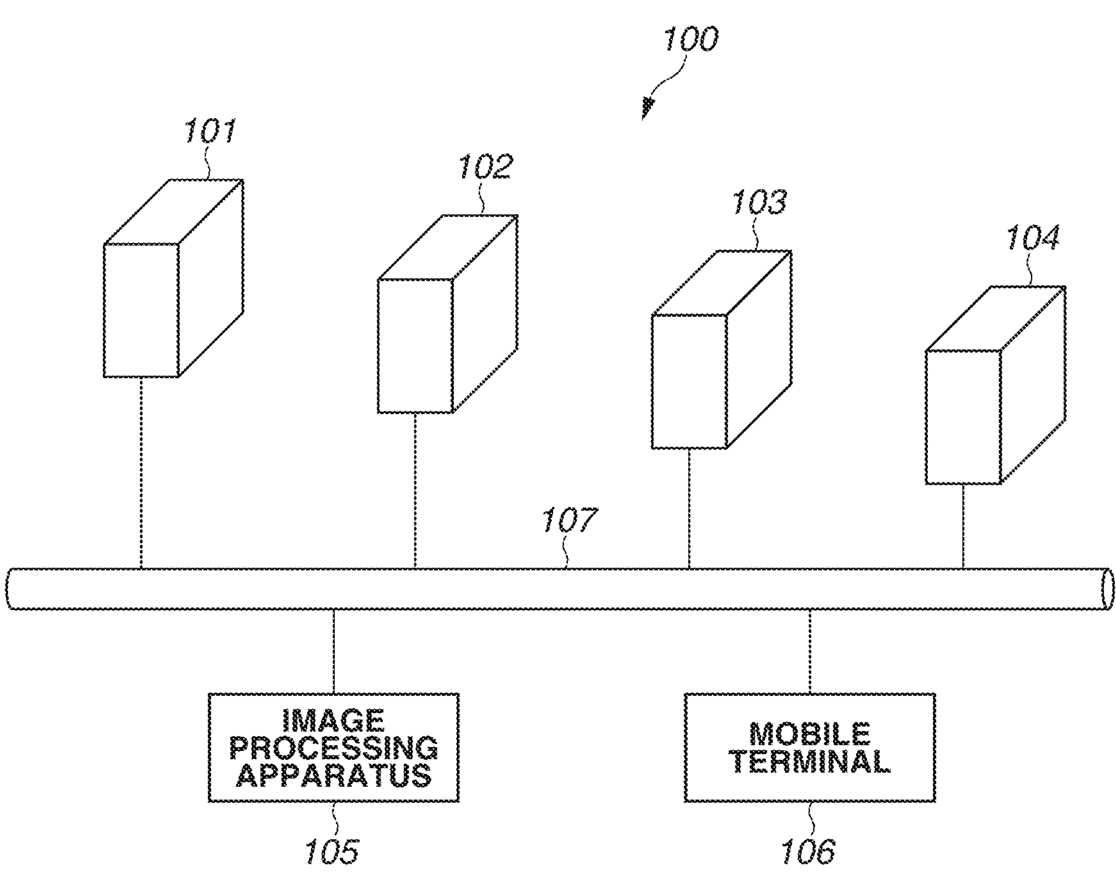
FIG. 1 is a diagram illustrating a configuration example of a system.

FIG. 1 is a diagram illustrating a configuration example of a system 100 according to the present embodiment. The system 100 includes a service providing server unit 101 for providing a service, a server 102, a server 103, a web server 104, an image processing apparatus 105, and a mobile terminal 106, which are connected via a communication network 107 in such a manner that communication can be performed with each other.

The image processing apparatus 105 is one type of an electronic device, and is a printer that can print printing data on a printing medium such as a print sheet. Various cloud services (web services) provided by the service providing server unit 101 can be used from the image processing apparatus 105 via the communication network 107.

For example, printing data (photos, documents, games such as Sudoku, fixed-format documents such as music sheets and graph paper, paper crafts, calendar, etc.) stored on a cloud (i.e. the service providing server unit 101) can be acquired and printed by the image processing apparatus 105. In addition, for example, scan data read by a scanner included in the image processing apparatus 105 can be stored on the cloud or transmitted as an e-mail.

To use a service provided by the service providing server unit 101, from the image processing apparatus 105, user permission for the transmission of information regarding a service use is to be acquired. For this reason, in using a service provided by the service providing server unit 101, from the image processing apparatus 105 for the first time (in first-time use), a screen for a user selecting whether to agree or not agree (disagree) with a service permission message is displayed. Then, control is performed in such a manner that user agreement with the service permission message is obtained by receiving the selection of an option corresponding to agreement.

FIG. 2A illustrates an example of a service permission message (permission matter, permission text, permission words, statement of agreement). In a case where an operation of agreeing with a service permission message is performed, it is determined that user permission for the transmission of information regarding a service use has been acquired. The service permission message to obtain agreement is sometimes updated by an administrator in accordance with various situation changes such as function addition to a service or the image processing apparatus 105, or law amendment. For this reason, the image processing apparatus 105 according to the present embodiment performs control in such a manner as to reacquire permission from a user if the service permission message is updated when using a service provided by the service providing server unit 101, from the image processing apparatus 105, in addition to the case of using the service for the first time.

The image processing apparatus 105 also transmits information regarding a usage situation of the image processing apparatus 105, to a server at a specific timing to enable a service provider to use the information for user analysis. The specific timing is a fixed time on a fixed day such as once every month, for example, (one regular timing in a month). The user permission for the transmission of the information regarding a usage situation of the image processing apparatus 105 is to be acquired as well. For this reason, before the information regarding a usage situation is transmitted from the image processing apparatus 105, a screen for a user selecting whether to agree or not agree (disagree) with an analysis permission message is displayed. Then, control is performed in such a manner that user agreement with the analysis permission message is obtained by receiving the selection of an option corresponding to agreement.

In the present embodiment, control is performed in such a manner as to separately obtain user agreement with the service permission message and user agreement with the analysis permission message. FIG. 2B illustrates an example of an analysis permission message. In a case where an operation of agreeing with an analysis permission message is performed, it is determined that user permission for the transmission of information regarding a usage situation has been acquired. The analysis permission message to obtain agreement is sometimes updated by an administrator in accordance with various situation changes such as function addition to a service or the image processing apparatus 105, or law amendment. For this reason, the image processing apparatus 105 according to the present embodiment performs control in such a manner as to reacquire permission from a user if the analysis permission message is updated when transmitting information regarding a usage situation to a server from the image processing apparatus 105, in addition to the case of transmitting the information for the first time.

A service permission message and an analysis permission message are managed with being assigned a new version number each time update is performed. As illustrated in FIG. 2C, a combination of a version of a service permission message and a version of an analysis permission message is managed with being assigned a version of a permission set.

For example, as illustrated in FIG. 2C, a version 1 of a permission set is a combination of a version 1 of a service permission message and a version 1 of an analysis permission message. A version 2 of a permission set is a combination of a version 2 of a service permission message and a version 1 of an analysis permission message. Because the versions of the service permission message are different while the versions of the analysis permission message are the same (version 1) between the versions 1 and 2 of the permission sets, the version of the permission set becomes not 1 but 2. Such information regarding versions is recorded on the server 102 and the server 103.

A region-by-region (country-by-country) latest version of a permission set is managed with being recorded on the server 103. FIG. 2D illustrates an example of information recorded on the server 103. As illustrated in FIG. 2D, for example, a latest version of a permission set in Japan is the version 1. For this reason, by checking the information against the information illustrated in FIG. 2C, it can be identified that the version of a service permission message to obtain agreement in Japan at the present moment is the version 1, and the version of an analysis permission message to obtain agreement is the version 1.

As illustrated in FIG. 2D, for example, a latest version of a permission set in the United States is the version 2. For this reason, by checking the information against the information illustrated in FIG. 2C, it can be identified that the version of a service permission message to obtain agreement in the United States at the present moment is the version 2, and the version of an analysis permission message to obtain agreement is the version 1.

In this manner, by managing the version of a permission message to obtain agreement, by region (country) of the world, control can be performed in such a manner as to acquire agreement with a service permission message and an analysis permission message that are suitable for the server 103 of a region (country) where the image processing apparatus 105 is installed.

Region-by-region (country-by-country) latest permission messages (service permission message and analysis permission message as illustrated in FIGS. 2A and 2B) are recorded on the web server 104.

In the present embodiment, the server 102 and the server 103 are separately illustrated, but the server 102 and the server 103 may be integrated into one.

Figure 3:
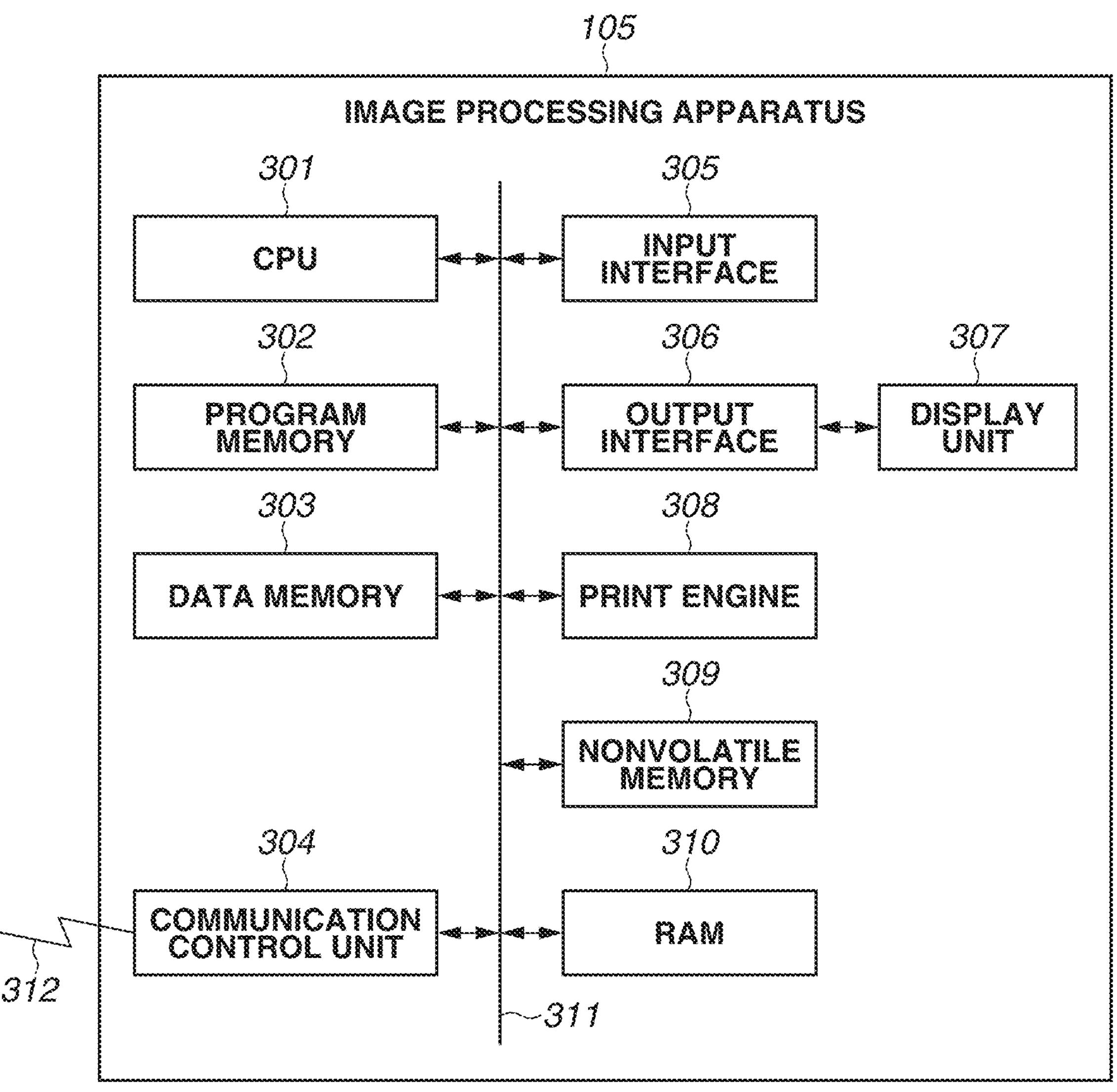
FIG. 3 is a diagram illustrating a configuration example of an image processing apparatus.

FIG. 3 is a diagram illustrating a configuration example of the image processing apparatus 105 according to the present embodiment. The image processing apparatus 105 is one type of an electronic device, and is a printer that can execute print processing using a print engine 308, or a print control apparatus that transmits printing data to a printer. A CPU 301, a program memory 302, a data memory 303, a communication control unit 304, an input interface 305, an output interface 306, a display unit 307, a print engine 308, a nonvolatile memory 309, and a random access memory (RAM) 310 are connected via a bus 311.

The CPU 301 is a system control unit including at least one processor, and controls the entire image processing apparatus 105. The program memory 302 is a nonvolatile storage medium storing control programs to be executed by the CPU 301, and embedded operating system programs. The data memory 303 stores program control variables, and includes various work buffer regions to be used during processing of the print engine 308.

The communication control unit 304 controls data transmission to and reception from the outside via a communication line 312. The communication control unit 304 is a communication interface such as a wired local area network (LAN) or a wireless LAN. The communication control unit 304 can communicate with the service providing server unit 101, the server 102, and the server 103 via the communication line 312 and the communication network 107.

The input interface 305 is an interface for receiving data input and operation instructions from the user, and includes operation members such as a physical keyboard, buttons, and a touch panel. The output interface 306 to be described below and the input interface 305 may be integrated into a single member that performs screen output and the reception of operations from the user. The output interface 306 is an interface that controls the display unit 307 to display data and notify the user of the status of the image processing apparatus 105.

The display unit 307 is a display that includes a light-emitting diode (LED) or a liquid crystal display (LCD), and displays data and notifies the user of the status of the image processing apparatus 105. Inputs from the user may be received via the display unit 307 by displaying software keys such as numerical entry keys, mode setting keys, a determination key, an undo key, and a power key on the display unit 307.

The print engine 308 forms an image (performs printing) on a recording medium such as paper using a recording material such as ink based on information stored in the data memory 303 or a received print job, and outputs a print result.

The nonvolatile memory 309 includes devices such as an electrically erasable programmable read-only memory (EEPROM) and a flash memory. The nonvolatile memory 309 is mainly used for the purpose of storing data such as setting values of the image processing apparatus 105 that needs to be held even when the power of image processing apparatus 105 is not supplied.

The RAM 310 includes a dynamic random access memory (DRAM) that requires a backup power supply. The RAM 310 is also used as a main memory and a work memory of the CPU 301, and stores a receive buffer for temporarily storing print information received from the mobile terminals 106, and various types of information.

FIGS. 4A to 4D each illustrate an example of management information of an agreement status (permission state) of a permission message in the image processing apparatus 105 that is stored in the nonvolatile memory 309. The nonvolatile memory 309 is one type of a storage unit, and stores management information of a permission state that indicates whether an operation representing user agreement with a permission matter indicating that the user permits the transmission of information from the image processing apparatus 105 to the service providing server unit (transmission destination) 101 has been received.

The management information of the permission state that is stored in the nonvolatile memory 309 includes information indicating whether an operation representing user permission for the transmission of information regarding the image processing apparatus 105 from the image processing apparatus 105 to the service providing server unit 101 via the communication network 107 has been received. The communication network 107 is the internet, for example.

A recorded state 401 indicates an example of a default value of management information of a permission state in a factory default state of the image processing apparatus 105. A value corresponding to an unpermitted state is recorded for both of a service permission message and an analysis permission message. The unpermitted state refers to a state in which the user has neither agreed nor disagreed with each permission message. A default value indicating that no version is applicable is recorded as a permission message version. As information indicating permission states of a service permission message and an analysis permission message, aside from the unpermitted state indicated in the recorded state 401, a value corresponding to any of three states including two states corresponding to a granted (agreed, permitted) state and an ungranted (disagreed, unpermitted) state is recorded.

A recorded state 402 is a recorded state indicating a state in which the user has agreed with a version 1 of a service permission message corresponding to a permission set 1, and the user has agreed with a version 1 of an analysis permission message corresponding to the permission set 1. For example, the recorded state 402 is a recorded state to be recorded in a case where the user has performed the registration into a cloud service with a view to using a service for the first time, and performed an operation of agreeing with a service permission message and an analysis permission message, at a timing of certain date and time A from the default state in the recorded state 401. The granted (permitted) state indicates that an operation representing agreement has been received.

The management information of a permission state of a service permission message is information indicating whether an operation representing user permission for the transmission of information regarding a service use from the image processing apparatus 105 to the service providing server unit 101 via the communication network 107 has been received.

The management information of a permission state of an analysis permission message is information indicating whether an operation representing user permission for the transmission of information regarding a usage situation of the image processing apparatus 105 from the image processing apparatus 105 to the service providing server unit 101 via the communication network 107 has been received.

In a case where a permission state of a service permission message or an analysis permission message is a permission state indicating that an operation representing user agreement has been received, a version of the permission message (permission matter) is stored in the permission message version as identifiable information.

A recorded state 403 is a recorded state indicating a state in which the user has agreed with a version 2 of a service permission message corresponding to a permission set 2, and the user has agreed with a version 1 of an analysis permission message corresponding to the permission set 2. For example, the user tries to use the service again at a timing of date and time B later than the date and time A from the state in the recorded state 402 in which the user has already performed registration into the cloud service and has ever used the service. The recorded state 403 is a recorded state to be recorded in a case where a permission message is updated in this case, processing of requiring the user to agree with each permission message again has been performed, and an operation of agreeing with each permission message has been performed.

If an operation of initializing the main body of the image processing apparatus 105 is performed from the state in the recorded state 402 or 403, the state is initialized to the state in the recorded state 401. A recorded state 404 is a recorded state indicating the ungranted (disagreed) state in which the user has disagreed with each permission message.

Figure 5B:
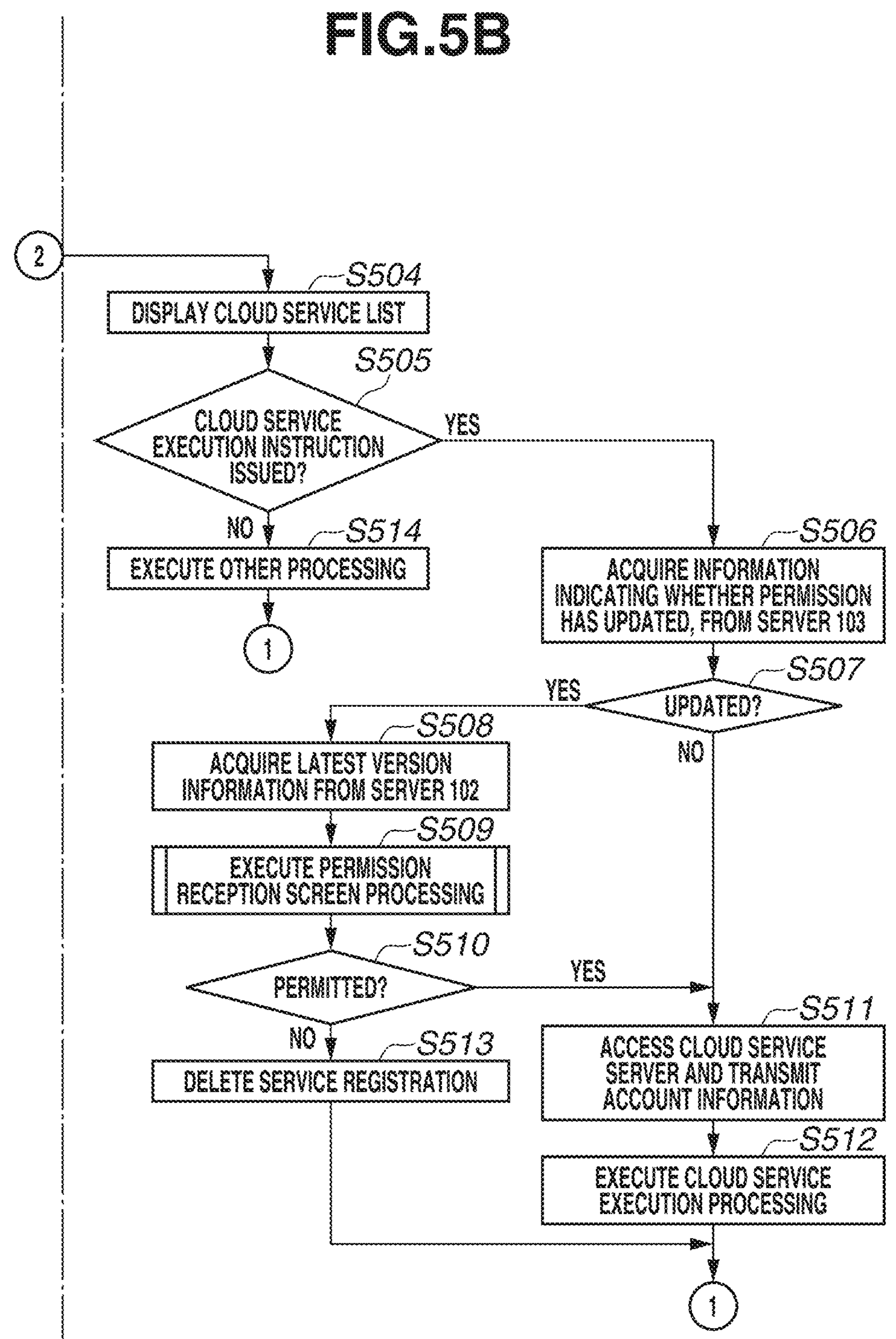

FIGS. 5A and 5B are a flowchart illustrating a method for controlling the image processing apparatus 105 according to the present embodiment. A flow of processing from when the user turns the power of the image processing apparatus 105 on to when the user turns the power off will be described. Each piece of processing in this flowchart is implemented by the CPU 301 loading a program stored in the program memory 302, onto the RAM 310, and executing the program.

In step S501, the CPU 301 controls the display unit 307 to display an initial screen. FIG. 6A illustrates a display example of an initial screen. FIG. 6A illustrates a display example of an initial screen (home screen) to be initially displayed after the image processing apparatus 105 is activated, and buttons 601 to 603 of options corresponding to functions executable by the image processing apparatus 105, such as copy, scan, and print, are displayed.

In step S502, the CPU 301 determines whether the selection of a cloud service has been performed by the user. In a case where a cloud service has been selected (YES in step S502), the processing proceeds to step S503. In a case where a cloud service has not been selected (NO in step S502), the processing proceeds to step S520. The selection of a cloud service can be performed by selecting a "print" button 603 in FIG. 6A, transitioning to a print screen illustrated in FIG. 6B, and selecting "print from cloud" 612. On the print screen illustrated in FIG. 6B, "print from memory card" 611, the "print from cloud" 612, "print pattern paper" 613, and "print template" 614 are selectable.

In step S503, the CPU 301 determines whether the image processing apparatus 105 has already been registered in a cloud service. In a case where the image processing apparatus 105 has already been registered in a cloud service (YES in step S503), the processing proceeds to step S504. In a case where the image processing apparatus 105 has not been registered in a cloud service (NO in step S503), the processing proceeds to step S515. Because the image processing apparatus 105 cannot be registered in the cloud service unless the user has agreed with a service permission message, in a case where it is determined in step S503 that the image processing apparatus 105 has been registered in the cloud service, in this state, a value indicating agreement (permission) with the service permission message is recorded in the management information of a permission state.

In step S504, the CPU 301 controls the display unit 307 to display a list screen of cloud services. FIG. 6C illustrates a display example of a list screen of cloud services.

In a case where the image processing apparatus 105 has been registered in a cloud service, by selectin the "print from cloud" 612 on the print screen in FIG. 6B, a list of registered cloud services is displayed as options 621 to 624 as illustrated in FIG. 6C.

In step S505, the CPU 301 determines whether an execution instruction of a cloud service displayed in step S504 has been issued by the user. In a case where a cloud service execution instruction has been issued (YES in step S505), the processing proceeds to step S506. In a case where a cloud service execution instruction has not been issued (NO in step S505), the processing proceeds to step S514. If any of the options 621 to 624 is selected from the list of registered cloud services displayed in FIG. 6C, and an execution instruction operation is performed, it is determined that a cloud service execution instruction has been issued by the user. This execution instruction operation is an example of the occurrence of a specific event requiring processing in steps S511 and S512 to be performed.

In step S514, the CPU 301 performs other processing that corresponds to a user operation and differs from the execution of a cloud service in step S505. After that, the processing returns to step S501.

In step S506, the CPU 301 acquires information making identifiable a version of a latest service permission message to obtain agreement in an installation region (installation country) of the image processing apparatus 105, from the server 103 as information regarding the update of a service permission message. In this step, the CPU 301 functions as an acquisition unit. The version of the latest service permission message is a version to obtain agreement at the present moment, and is a version of a service permission message that the user is required to agree with. The server 103 is one type of an external device.

More specifically, the CPU 301 transmits, to the server 103, information (one or both, i.e., at least one of an internet protocol (IP) address and destination information stored in the nonvolatile memory 309) making identifiable a region (country) where the image processing apparatus 105 is installed. The server 103 transmits, to the image processing apparatus 105, a version of a latest permission set in a region corresponding to information making a region identifiable that has been received from the image processing apparatus 105, among region-by-region latest versions illustrated in FIG. 2D. That is, the image processing apparatus 105 acquires a version of a permission set indicating a permission message to obtain agreement in an installation region of the image processing apparatus 105, from the server 103.

In step S507, the CPU 301 compares the version of the permission set indicating the permission message to obtain agreement in the installation region of the image processing apparatus 105 that has been acquired in step S506, and management information of a permission state in the image processing apparatus 105 that is stored in the nonvolatile memory 309.

The management information of the permission state includes a permission message version illustrated in FIGS. 4A to 4D.

The CPU 301 determines whether the permission message (permission matter) to obtain agreement has been updated from the permission message that the user has agreed with in the image processing apparatus 105. That is, the CPU 301 determines whether a permission message is to obtain agreement again. In a case where the permission message has been updated (the permission message is to obtain agreement again) (YES in step S507), the processing proceeds to step S508. In a case where the permission message has not been updated (the permission message is not to obtain agreement again) (NO in step S507), the processing proceeds to step S511 without the execution of the processing in steps S508 to S510 (i.e., without further user operation).

More specifically, the CPU 301 compares the version of the permission set indicating the permission message to obtain agreement in the installation region of the image processing apparatus 105 that has been acquired in step S506 (version that the user is to agree with), and a version of a permission set of a permission message version in management information of a permission state in the image processing apparatus 105 that is stored in the nonvolatile memory 309 (version that the user has already agreed with). In a case where the version that the user is to agree with and the version that the user has already agreed with are the same, the CPU 301 determines that agreement is not to be obtained again. In a case where the version that the user is to agree with and the version that the user has already agreed with are different, the CPU 301 determines that agreement is to be obtained again. If the version that the user is to agree with is larger than the version that the user has already agreed with, the CPU 301 determines that agreement is to be obtained again.

In step S508, the CPU 301 acquires, from the server 102, information indicating the version (latest version of the permission set) of the latest permission message in the installation region of the image processing apparatus 105 that has been acquired in step S506. As the version that the user has already agreed with, which is to be stored in the nonvolatile memory 309 when the user agrees with each permission message in subsequent processing in step S509, the latest version of the permission set that has been acquired in this step S508 is recorded. Alternatively, this step S508 may be skipped, and the latest version of the permission set in the installation region that has been acquired in step S506 may be recorded, as the version that the user has already agreed with, which is to be stored in the nonvolatile memory 309 when the user agrees with each permission message in step S509.

In step S509, by permission reception screen processing, the CPU 301 receives the presence or absence of agreement with (permission for) latest each permission message in the installation region from the user. Specifically, the CPU 301 controls the display unit 307 to display a permission reception screen for receiving agreement with an updated permission message from the user. The permission reception screen processing will be described below with reference to FIGS. 7A and 7B. In this manner, even in the case of an already-registered cloud service, each time the user tries to execute a function of the cloud service, the CPU 301 determines whether agreement with a permission message is to be reacquired, and if agreement with a permission message is to be reacquired, the agreement is reacquired before the execution of the service. With this configuration, it is possible to avoid the occurrence of a situation where a service is executed without reacquisition of agreement in a case where agreement with a permission message is to be reacquired.

In the processing in S509, before the processing in step S701 of FIG. 7A is performed, a screen illustrated in FIG. 6D is displayed. On the screen, a message "check permission again because permission matter has been updated" indicating that the reason why the reacquisition of permission becomes necessary is that a permission matter (permission message) has been updated, and permission to be checked again is to be displayed from now is displayed. With this configuration, a user who has ever granted permission by agreeing with a permission message once can recognize the reason why the user is required to agree with a permission message again, and can perform a permission operation again without misunderstanding the message as or confusing the message with an operation failure. If a next button in the screen in FIG. 6D is pressed, the processing in step S701 of FIG. 7A that is to be described below is started.

Similarly, also in processing in step S525 that is to be described below (processing of receiving permission again), before the processing in step S701 of FIG. 7A is performed, the display of the screen in FIG. 6D is performed. On the other hand, in step S517 to be described below in which processing of receiving permission for the first time is performed instead of the processing of receiving permission again, the processing in step S701 of FIG. 7A is performed without performing the display of the screen in FIG. 6D.

In step S510, the CPU 301 determines whether user agreement with the latest service permission message has been obtained in step S509. Specifically, the CPU 301 refers to the management information of a permission state (FIGS. 4A to 4D) in the image processing apparatus 105 that is stored in the nonvolatile memory 309, and determines whether a value corresponding to the "granted (permitted) state" is recorded as a value indicating an agreement status of a service permission message. In a case where a value corresponding to the "granted (permitted) state" is recorded (YES in step S510), the processing proceeds to step S511. In a case where a value corresponding to the "granted (permitted) state" is not recorded (NO in step S510), the processing proceeds to step S513.

In step S511, the CPU 301 accesses the service providing server unit 101, and performs control in such a manner as to transmit information necessary for the use of a service of which an execution instruction has been issued in step S505, to the service providing server unit (transmission destination) 101. For example, to open a service page for the user, the CPU 301 transmits an ID (device identification information of the image processing apparatus 105) and a password that are stored in the nonvolatile memory 309, as account information (registration information of the image processing apparatus 105 in the cloud service). According to the present embodiment, because the processing is controlled to be performed in a state in which agreement with a latest service permission message has been obtained from the user, the processing becomes a legitimate operation (processing).

In step S512, based on the account information transmitted in step S511, the CPU 301 performs execution processing of the cloud service of which an execution instruction has been issued in step S505. For example, in the case of a cloud photo storage, a list of images stored on a cloud is displayed, and processing corresponding to a subsequent user operation is performed. If the execution processing of the cloud service ends (if the use of the cloud service ends), the processing returns to step S501.

In step S513, because user agreement with the latest service permission message fails to be obtained and the ungranted state is caused, the CPU 301 deletes the ID (device identification information) and the password of the image processing apparatus 105 for the cloud service from the nonvolatile memory 309. That is, the CPU 301 deletes registration information of the image processing apparatus 105 in the cloud service. The CPU 301 also transmits, to the service providing server unit 101, a request for deletion of the ID (device identification information) and the password of the image processing apparatus 105 (i.e., registration information of the image processing apparatus 105 in the cloud service). In this step, a message indicating that registration in the cloud service has been deleted may also be displayed on the display unit 307. After that, the processing returns to step S501.

In step S515, the CPU 301 determines whether the user has performed a cloud service registration operation. In a case where the user has performed a cloud service registration operation (YES in step S515), the processing proceeds to step S516. In a case where the user has not performed a cloud service registration operation (NO in step S515), the processing returns to step S501. In a case where none of users of the image processing apparatus 105 are registered in the cloud service, in the cloud service list in FIG. 6C, each cloud service is displayed in such a manner that an unregistered state is identifiable. Then, an operation icon (not illustrated) for receiving registration in the cloud service is displayed. In a case where this operation icon is operated, the CPU 301 determines that a registration operation has been performed. Also in a case where a registration operation is performed on a cloud service registration screen included in a setting menu screen to be displayed by operating a gear icon 604 displayed on the initial screen in FIG. 6A, the CPU 301 performs the processing in steps S516 and S517.

In step S516, similarly to step S508 described above, the CPU 301 acquires, from the server 102, information indicating the latest version of the permission set in the installation region (information making the version of the latest permission message identifiable). The processing may be processing similar to the processing in step S506 by acquiring the information from the server 103.

In step S517, similarly to step S509 described above, by the permission reception screen processing, the CPU 301 receives agreement with the latest permission message from the user.

In step S518, the CPU 301 determines whether the user has agreed with the latest service permission message in step S517. In a case where agreement with the latest service permission message has been obtained (YES in step S518), the processing proceeds to step S519. In a case where agreement with the latest service permission message has not been obtained (NO in step S518), the processing returns to step S501 without the execution of the registration processing in the cloud service in step S519.

In step S519, the CPU 301 accesses the service providing server unit 101 and performs the registration processing in the cloud service. The image processing apparatus 105 transmits a registration request to the service providing server unit 101 together with information regarding the image processing apparatus 105 that is to be used for registration in the cloud service. After that, the CPU 301 receives the ID (device identification information) and the password of the image processing apparatus 105 that have been created by the service providing server unit 101 in response to the registration request, and stores the ID and the password in the nonvolatile memory 309. If the registration in the cloud service is completed, the processing proceeds to step S504, and the CPU 301 controls the display unit 307 to display the cloud service list.

In step S520, the CPU 301 determines whether the user has agreed with an analysis permission message. Specifically, the CPU 301 refers to the management information of a permission state (FIGS. 4A to 4D) in the image processing apparatus 105 that is stored in the nonvolatile memory 309, and determines whether a value corresponding to the "granted (permitted) state" is recorded as a value indicating an agreement status of an analysis permission message. In a case where a value corresponding to the "granted (permitted) state" is recorded (YES in step S520), the processing proceeds to step S521. In a case where a value corresponding to the "granted (permitted) state" is not recorded (NO in step S520), the processing proceeds to step S528.

In the present embodiment, the transmission of an analysis report in step S527 to be described below is performed only in a case where the user has agreed with the service permission message (in a case where registration in the cloud service has been performed). As described below, the reception of agreement/disagreement with the analysis permission message is performed only in a case where agreement with the service permission message has been obtained. Thus, in a case where a value corresponding to "unpermitted (default value)" is recorded for the analysis permission message in the management information of a permission state, because agreement with the service permission message has not been obtained, the transmission of an analysis report in step S527 to be described below is not performed. Thus, in a case where a value corresponding to the "ungranted (disagreed) state" is recorded as a value indicating an agreement status of an analysis permission message, or in a case where a value corresponding to "unpermitted (default value)" is recorded, in step S520, the CPU 301 determines that the user has not agreed with an analysis permission message (NO in step S520), the processing proceeds to step S528.

The transmission of an analysis report in step S527 to be described below can be performed irrespective of an agreement status of the service permission message. In this case, the determination in step S520 may be determination as to whether a value corresponding to the "granted (permitted) state" or "unpermitted (default value)" is recorded as a value indicating an agreement status of an analysis permission message. In this case, control is performed in such a manner that the processing proceeds to step S521 if an agreement status of an analysis permission message is the "granted (permitted) state" or "unpermitted (default value)", and the processing proceeds to step S528 if an agreement status of an analysis permission message is the "ungranted (disagreed) state".

In step S521, the CPU 301 determines whether a trigger event for the image processing apparatus 105 performing analysis report transmission to a server for user analysis has occurred. The trigger event includes, for example, at least one event of an event of a state change of the image processing apparatus 105 or a regular event (e.g., event at a specific time on specific date of every month). In a case where a report transmission trigger event has occurred (YES in step S521), the processing proceeds to step S522. In a case where a report transmission trigger event has not occurred (NO in step S521), the processing proceeds to step S528. This trigger event is an example of the occurrence of a specific event requiring processing in step S527 to be performed.

In step S522, the CPU 301 acquires information making identifiable a version of a latest analysis permission message to obtain agreement in an installation region (installation country) of the image processing apparatus 105, from the server 103 as information regarding the update of an analysis permission message. In this step, the version of the latest analysis permission message is a version to obtain agreement at the present moment, and is a version of an analysis permission message which the user is required to agree with. Specifically, similarly to step S506, the CPU 301 acquires, from the server 103, a version of a permission set indicating a permission message to obtain agreement in the installation country of the image processing apparatus 105.

In step S523, similarly to step S507, the CPU 301 determines whether the permission message to obtain agreement has been updated from the permission message that the user has agreed with in the image processing apparatus 105. In a case where the permission message has been updated (the permission message is to obtain agreement again) (YES in step S523), the processing proceeds to step S524. In a case where the permission message has not been updated (the permission message is not to obtain agreement again) (NO in step S523), the processing proceeds to step S527 without the execution of the processing in steps S524 to S526 (i.e., without further user operation).

In step S524, similarly to step S508, the CPU 301 acquires, from the server 102, information indicating the version (latest version of the permission set) of the latest permission message in the installation region. As the version that the user has already agreed with, which is to be stored in the nonvolatile memory 309 when the user agrees with each permission message in subsequent processing in step S525, the latest version of the permission set that has been acquired in this step S524 is recorded.

Alternatively, this step S524 may be skipped, and the latest version of the permission set that has been acquired in step S522 may be recorded, as the version that the user has already agreed with, which is to be stored in the nonvolatile memory 309 when the user agrees with each permission message in step S525.

In step S525, similarly to step S509, the CPU 301 performs permission reception screen processing.

In step S526, the CPU 301 determines whether the user has agreed with the latest analysis permission message in step S525. In a case where user agreement with the latest analysis permission message has been obtained (YES in step S526), the processing proceeds to step S527. In a case where user agreement with the latest analysis permission message has not been obtained (NO in step S526), the processing returns to step S501.

In step S527, the CPU 301 performs control in such a manner as to transmit, as an analysis report, information regarding user analysis (information regarding a usage situation) such as a user setting of the image processing apparatus 105 or the number of times each function is used, to the service providing server unit 101. According to the present embodiment, because the processing is controlled to be performed in a state in which agreement with a latest analysis permission message has been obtained from the user, the processing becomes a legitimate operation (processing). After that, the processing returns to step S501.

In step S528, the CPU 301 determines whether another event has occurred. In a case where another event has occurred (YES in step S528), the processing proceeds to step S529. In a case where another event has not occurred (NO in step S528), the processing proceeds to step S530.

In step S529, the CPU 301 performs processing corresponding to the event determined in step S528 to have occurred. For example, the CPU 301 performs copy processing corresponding to a copy instruction, scan processing corresponding to a scan instruction, and setting processing corresponding to various setting operations. After that, the processing proceeds to step S530.

In step S530, the CPU 301 determines whether an event of turning the power of the image processing apparatus 105 off has occurred. In a case where an event of turning the power of the image processing apparatus 105 off has occurred (YES in step S530), the flowchart in FIGS. 5A and 5B ends. In a case where an event of turning the power of the image processing apparatus 105 off has not occurred (NO in step S530), the processing returns to step S502.

In the example illustrated in FIGS. 5A and 5B, the description has been given of an example of acquiring, from the server 103, information (the latest version of the permission set in the installation region) for determining whether the permission matter to obtain agreement in the installation region has been updated, in step S506 or S522, in response to the occurrence of the event that requires information transmission to the service providing server unit 101 (processing in step S511 or processing in step S527) (YES in step S505 or YES in step S521). Nevertheless, the example is not limited to this, and the acquisition timing of the information for determining whether the permission matter to obtain agreement in the installation region has been updated may be before the occurrence of the event that requires information transmission to the service providing server unit 101. For example, the information may be preliminarily acquired by a push notification from the server 103 that is issued at the update time point. Alternatively, each time the power of the image processing apparatus 105 is turned on and communication with the communication network 107 via wireless communication or wired communication is started (i.e., in response to the establishment of communication with the network irrespective of whether the event that requires information transmission to the service providing server unit 101 has occurred), information (the latest version of the permission set in the installation region) for determining whether the permission matter to obtain agreement in the installation region has been updated may be acquired from the server 103 as described in step S506 or S522.

Figure 7B:
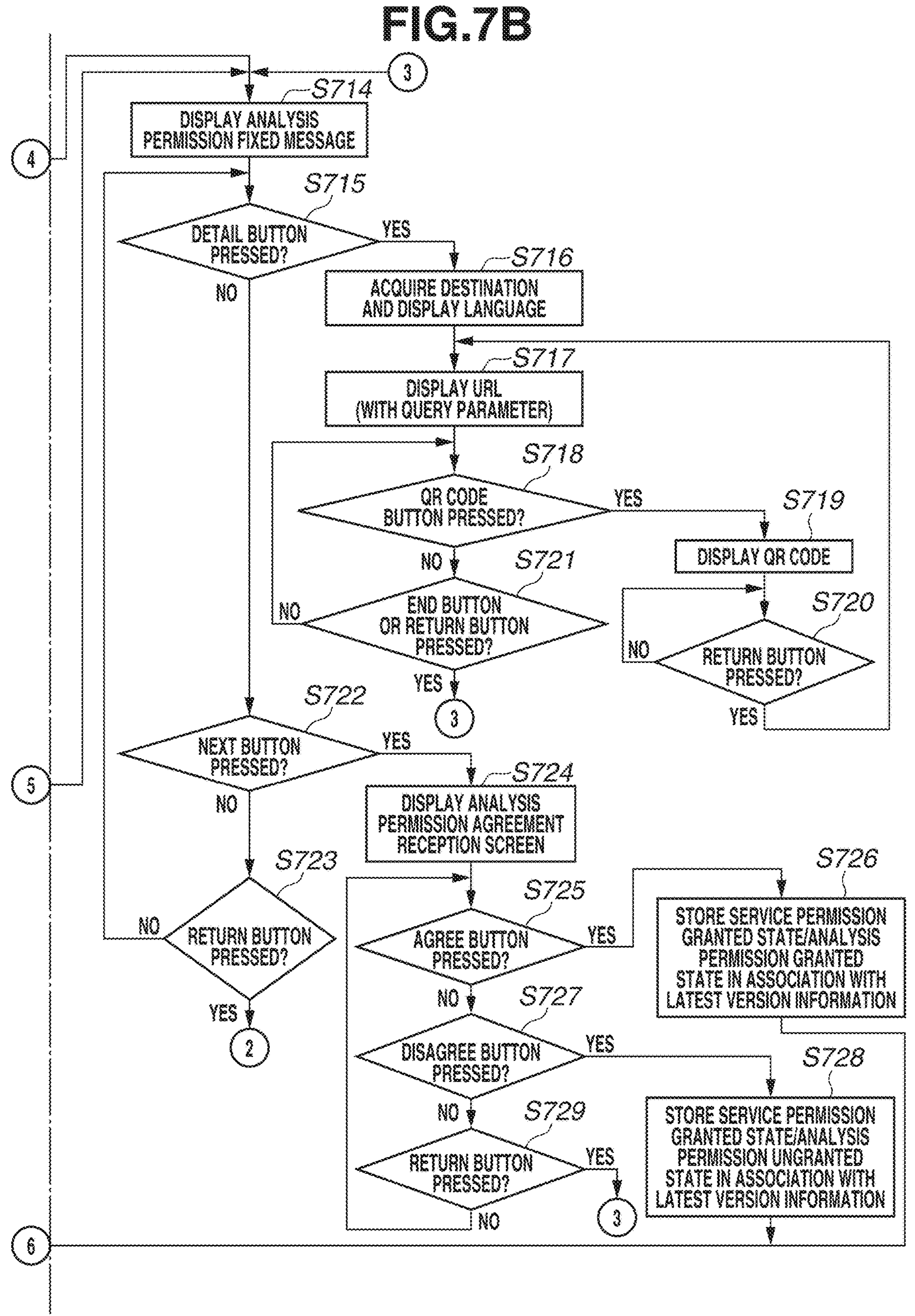
Figure 8:
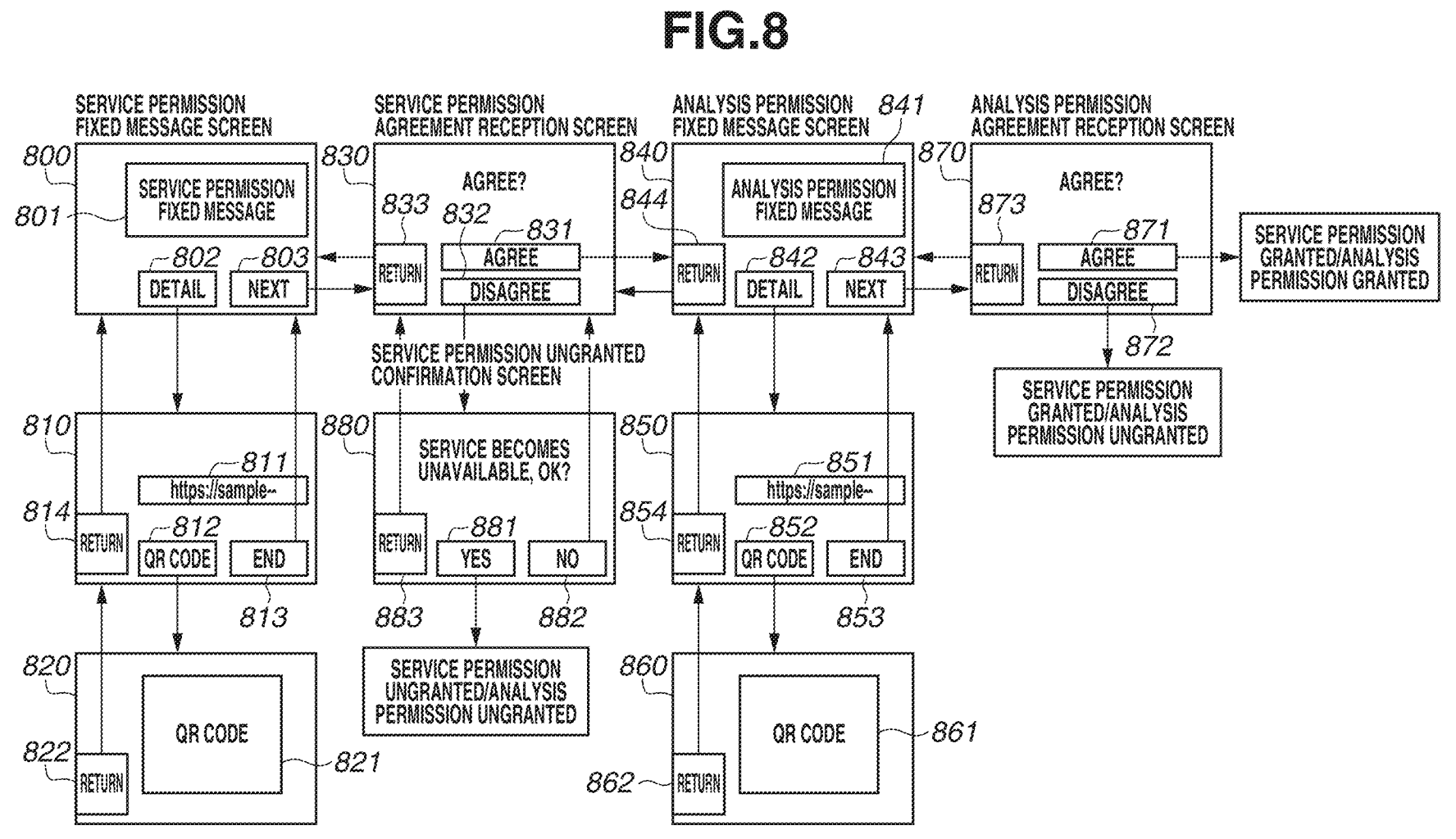

FIGS. 7A and 7B are a flowchart illustrating the details of the permission reception screen processing in steps S509, S517, and S525 of FIG. 5A. FIG. 8 illustrates various display examples to be displayed on the display unit 307 in the permission reception screen processing. Each piece of processing in the flowchart in FIGS. 7A and 7B is implemented by the CPU 301 loading a program stored in the program memory 302, onto the RAM 310, and executing the program.

In step S701, the CPU 301 determines whether a service permission is required to be regranted. Specifically, the CPU 301 compares a version of a service permission message permitted by the user, and a version of a latest service permission message to obtain agreement.

The version of the service permission message permitted by the user is identified from a permission message version recorded in the management information of a permission state (FIGS. 4A to 4D) in the image processing apparatus 105 that is stored in the nonvolatile memory 309. The version of the latest service permission message to obtain agreement is identified from the latest version of the permission set in the region (country) where the image processing apparatus 105 is installed that has been acquired from the server 102 or 103. In a case where the version of the service permission message permitted by the user is smaller than the version of the latest service permission message to obtain agreement, the CPU 301 determines that a service permission message is required to be permitted again (regranted agreement) (YES in step S701), the processing proceeds to step S702. In a case where the CPU 301 determines that a service permission message is not required to be permitted again (NO in step S701), the processing proceeds to step S714. Also in a case where "unpermitted (default value)" is recorded for the service permission message in the management information of a permission state in the image processing apparatus 105 that is stored in the nonvolatile memory 309, the CPU 301 determines that a service permission message is required to be permitted again (regranted agreement) (YES in step S701), the processing proceeds to step S702.

Alternatively, the processing may proceed to step S702 by skipping the processing in step S701, and control may be performed in such a manner as to surely reacquire agreement with a service permission message in a case where a permission version is updated. In this case, the version of the service permission message needs to be regranted agreement even if the service permission message itself has not been updated from the service permission message that the user has agreed with. In a case where the processing in FIGS. 7A and 7B is performed after the processing proceeds to step S509 if it is determined that the permission message has been updated (YES in step S507), the processing may proceed to step S702 by skipping the processing in step S701.

In step S702, the CPU 301 displays a service permission fixed message 801 on a service permission fixed message screen 800 in FIG. 8. The service permission fixed message 801 is similar to the service permission message in FIG. 2A, but a message at least partially different from a version 2 or a later version of a service permission message is displayed. More specifically, a message asking for user permission for the transmission of information regarding a service use is displayed, and a consistent message is displayed irrespective of the installation region (country) of the image processing apparatus 105 or the version of the service permission message. The service permission fixed message 801 may be the same as the message of the version 1 of the service permission message.

In step S703, the CPU 301 determines whether a detail button 802 has been touched (operation of selection, hereinafter, will also be referred to as "pressed") on the service permission fixed message screen 800. In a case where the detail button 802 has been pressed (YES in step S703), the processing proceeds to step S704.

In step S704, the CPU 301 acquires destination information stored in the nonvolatile memory 309, and display language information preset by the user in such a manner as to be displayed on a user interface (UI) of the image processing apparatus 105.

The destination information is information prerecorded on the nonvolatile memory 309 in a factory default state of the image processing apparatus 105, and information basically unchangeable by the user. As the destination information, for example, information indicating any of Japan (JPN), Korea (KOR), the United States (USA), Europe (EOR), Australia (AUS), Southeast Asia (ASA), China (CHN), Taiwan (TWN), and Brazil (BRA) is recorded.

The display language information is a setting item to be set by the user, and is set from a setting item of a display language that is included in the setting menu screen to be displayed by operating the gear icon 604 displayed on the initial screen in FIG. 6A. As the display language information, any of Japanese, English, Chinese, French, and German can be set.

In step S705, the CPU 301 controls the display unit 307 to display a URL character string display screen 810 which includes a character string 811 on which the destination information and the display language information acquired in step S704 as a query parameter is allocated to a uniform resource locator (URL) to access the web server 104. The query parameter is a URL parameter. For example, the CPU 301 displays "https://www.sample.co.jp/service?destination_code=01&language_code=01" as the character string 811. A part following "?" is the URL parameter, and in this part, "destination_code-01" corresponds to the destination information. "01" is a value indicating Japan. In addition, "language_code=01" corresponds to the display language information. "01" is a value indicating Japanese.

In step S706, the CPU 301 determines whether a quick response (QR) code (registered trademark) button 812 has been pressed on the URL character string display screen 810 in FIG. 8. In a case where the QR code button 812 has been pressed (YES in step S706), the processing proceeds to step S707.

In step S707, the CPU 301 controls the display unit 307 to display a QR code display screen 820 including a QR code 821 that is a QR code obtained by encoding the character string 811 displayed on the URL character string display screen 810 in FIG. 8, and can be read by capturing an image by a camera of the mobile terminal 106. The QR code 821 is a two-dimensional code, and the character string 811 can be acquired by reading and decoding the QR code 821 using the mobile terminal 106. That is, the QR code 821 is a code image including information regarding the character string 811. The QR code 821 may be a different code as long as the code is in a format readable by the camera of the mobile terminal 106. In place of the QR code 821, a two-dimensional code of another type, a one-dimensional code (barcode, etc.), or another code image (color code, etc.) may be displayed.

In steps S705 and S707, the CPU 301 functions as a display control unit, and controls the display unit 307 to display information indicating a URL including additional information making an installation region of the image processing apparatus 105 identifiable that is stored in the nonvolatile memory 309. The above-described URL is a URL for displaying a service permission matter stored in the web server 104. In addition, the above-described URL is a URL to which additional information indicating a setting of a display language is further added. The information indicating the URL is the character string 811 or the QR code 821, for example. The additional information is a URL parameter, for example. The additional information making a region identifiable is information that is based on destination information stored in the nonvolatile memory 309 from the factory default state of the image processing apparatus 105, for example.

The above-described URL may be a URL to which information indicating at least a part of an IP address dynamically allocated to the image processing apparatus 105 is added as the above-described additional information making a region identifiable.

In a case where the service permission message in FIG. 2A that is to be granted user agreement and stored in the web server 104 is the same as the service permission fixed message 801 stored in the nonvolatile memory 309, the CPU 301 may perform control in such a manner as not to display information indicating a URL.

The above-described URL may be a URL to which additional information indicating the version of the service permission message acquired is step S506 is further added.

If the character string 811 displayed on the URL character string display screen 810 in FIG. 8 is entered into an address bar of a web browser to be executed on the mobile terminal 106, and access is made to an address indicated by the character string 811, the following processing is performed. In addition, if the QR code 821 displayed on the QR code display screen 820 in FIG. 8 is imaged and decoded using the camera of the mobile terminal 106, and access is made to an address indicated by the obtained character string 811, the following processing is performed.

The mobile terminal 106 accesses the address indicated by the character string 811. An access destination is the web server 104. If the mobile terminal 106 accesses the address indicated by the character string 811, the mobile terminal 106 transmits information regarding the URL parameter included in the character string 811, to the access destination, and issues a request for a web page corresponding to the URL parameter, to the web server 104.

The web server 104 accessed by the mobile terminal 106 receives the information regarding the URL parameter included in the character string 811. Then, the web server 104 acquires (extracts) destination information and display language information of the image processing apparatus 105 from the URL parameter included in the character string 811. Then, the web server 104 transmits, to the mobile terminal 106, a web page on which a service permission message corresponding to the acquired destination information and display language information is displayed. For example, the web server 104 transmits a HyperText Markup Language (HTML) file corresponding to the acquired destination information and display language information, to the mobile terminal 106.

By displaying the web page transmitted in this manner by the web browser on the mobile terminal 106, it is possible to display a latest service permission message corresponding to the destination information and the display language information of the image processing apparatus 105, on the mobile terminal 106. The service permission message to be displayed is the message illustrated in FIG. 2A, for example. If the mobile terminal 106 accesses the displayed information indicating the URL, a service permission matter corresponding to a region of the destination information is automatically displayed. The mobile terminal 106 is one type of a different device. By operating the image processing apparatus 105 after browsing the web page displayed on the mobile terminal 106, the user selects an operation of agreeing or disagreeing with the service permission message.

In step S708, the CPU 301 determines whether a return button 822 has been pressed on the QR code display screen 820. In a case where the return button 822 has been pressed (YES in step S708), the processing proceeds to step S705.

In step S709, the CPU 301 determines whether an end button 813 or a return button 814 has been pressed on the URL character string display screen 810. In a case where the end button 813 or the return button 814 has been pressed (YES in step $709), the processing returns to step S702. In a case where the end button 813 or the return button 814 has not been pressed (NO in step S709), the processing returns to step S706.

In step S710, the CPU 301 determines whether a next button 803 has been pressed on the service permission fixed message screen 800. In a case where the next button 803 has been pressed (YES in step S710), the processing proceeds to step S711.

In step S711, the CPU 301 controls the display unit 307 to display a service permission message agreement reception screen 830. On the service permission message agreement reception screen 830, an "agree" button 831 and a "disagree" button 832 are displayed.

In step S712, the CPU 301 determines whether the "agree" button 831 has been pressed on the service permission message agreement reception screen 830. The CPU 301 functions as a reception unit, and receives an operation representing user agreement with a service permission matter indicating that the user permits the transmission of information from the image processing apparatus 105 to the service providing server unit (transmission destination) 101. In a case where the "agree" button 831 has been pressed (YES in step S712), the processing proceeds to step S714. In a case where the "agree" button 831 has not been pressed (NO in step S712), the processing proceeds to step S713.

Because the case where the processing proceeds to step S726 or S728 to be described below includes only a case where agreement with the service permission message has been selected, at the time point at which it is determined that the "agree" button 831 has been pressed (YES in step S712), agreement with the service permission message is not recorded in the management information of a permission state, and the agreement is recorded in step S726 or S728.

Nevertheless, at the time point at which it is determined that the "agree" button 831 has been pressed (YES in step S712), the CPU 301 may record agreement with the service permission message in the management information of a permission state.

In step S713, the CPU 301 determines whether the "disagree" button 832 has been pressed on the service permission message agreement reception screen 830. In a case where the "disagree" button 832 has been pressed (YES in step S713), the processing proceeds to step S730. In a case where the "disagree" button 832 has not been pressed (NO in step S713), the processing proceeds to step S734.

In step S714, the CPU 301 controls the display unit 307 to display an analysis permission fixed message 841 on the analysis permission fixed message screen 840. The analysis permission fixed message 841 is similar to the analysis permission message in FIG. 2B, but a message at least partially different from a version 2 or a later version of an analysis permission message is displayed. More specifically, a message asking for user permission for the transmission of information regarding a usage situation of the image processing apparatus 105 (analysis report) is displayed, and a consistent message is displayed irrespective of the installation region (country) of the image processing apparatus 105 or the version of the analysis permission message. The analysis permission fixed message 841 may be the same as the message of the version 1 of the analysis permission message.

In step S715, the CPU 301 determines whether a detail button 842 has been pressed on the analysis permission fixed message screen 840. In a case where the detail button 842 has been pressed (YES in step S715), the processing proceeds to step S716.

In step S716, similarly to step S704, the CPU 301 acquires destination information stored in the nonvolatile memory 309, and display language information set by the user.

In step S717, the CPU 301 controls the display unit 307 to display a URL character string display screen 850 which includes a character string 851 on which the destination information and the display language information acquired in step S716 as a query parameter is allocated to a URL to access the web server 104. For example, the CPU 301 displays "https://www.sample.co.jp/analysis?destination_code=01&language_code=01" as the character string 851. A part following "?" is a URL parameter, and in this part, "destination_code-01" corresponds to the destination information. "01" is a value indicating Japan. In addition, "language_code=01" corresponds to the display language information. "01" is a value indicating Japanese.

In step S718, the CPU 301 determines whether a QR code button 852 has been pressed on the URL character string display screen 850. In a case where the QR code button 852 has been pressed (YES in step S718), the processing proceeds to step S719.

In step S719, the CPU 301 controls the display unit 307 to display a QR code display screen 860 including a QR code 861 that can be read using the mobile terminal 106. The QR code 861 on the QR code display screen 860 is a QR code obtained by encoding the character string 851 displayed on the URL character string display screen 850 in FIG. 8, and can be read by capturing an image by a camera of the mobile terminal 106. The QR code 861 is a two-dimensional code, and the character string 851 can be acquired by reading and decoding the QR code 861 using the mobile terminal 106. That is, the QR code 861 is a code image including information regarding the character string 851. The QR code 861 may be a different code as long as the code is in a format readable by the camera of the mobile terminal 106. In place of the QR code 861, a two-dimensional code of another type, a one-dimensional code (barcode, etc.), or another code image (color code, etc.) may be displayed.

In steps S717 and S719, the CPU 301 controls the display unit 307 to display information indicating a URL including additional information making an installation region of the image processing apparatus 105 identifiable that is stored in the nonvolatile memory 309. The above-described URL is a URL for displaying an analysis permission matter stored in the web server 104. In addition, the above-described URL is a URL to which additional information indicating a setting of a display language is further added. The information indicating the URL is the character string 851 or the QR code 861, for example. The additional information is a URL parameter, for example. The additional information making a region identifiable is information that is based on destination information stored in the nonvolatile memory 309 from the factory default state of the image processing apparatus 105, for example.

The above-described URL may be a URL to which information indicating at least a part of an IP address dynamically allocated to the image processing apparatus 105 is added as the above-described additional information making a region identifiable.

In a case where the analysis permission message in FIG. 2B that is stored in the web server 104 and to obtain agreement from the user is the same as the analysis permission fixed message 841 stored in the nonvolatile memory 309, the CPU 301 may perform control in such a manner as not to display information indicating a URL.

The above-described URL may be a URL to which additional information indicating the version of the analysis permission message acquired is step S522 is further added.

The character string 851 displayed on the URL character string display screen 850 in FIG. 8 is entered into an address bar of a web browser to be executed on the mobile terminal 106, and access is made to an address indicated by the character string 851. As a result, by the processing similar to the display of the above-described service permission message, a latest analysis permission message (message exemplified in FIG. 2B) corresponding to the destination information and the display language information included in the URL parameter included in the character string 851 is displayed on a display unit of the mobile terminal 106. By operating the image processing apparatus 105 after browsing the web page displayed on the mobile terminal 106, the user selects an operation of agreeing or disagreeing with the analysis permission message.

In step S720, the CPU 301 determines whether a return button 862 has been pressed on the QR code display screen 860. In a case where the return button 862 has been pressed (YES in step S720), the processing proceeds to step S717.

In step S721, the CPU 301 determines whether an end button 853 or a return button 854 has been pressed on the URL character string display screen 850. In a case where the end button 853 or the return button 854 has been pressed (YES in step S721), the processing proceeds to step S714. In a case where the end button 853 or the return button 854 has not been pressed (NO in step S721), the processing proceeds to step S718.

In step S722, the CPU 301 determines whether a next button 843 has been pressed on the analysis permission fixed message screen 840. In a case where the next button 843 has been pressed (YES in step S722), the processing proceeds to step S724. In a case where the next button 843 has not been pressed (NO in step S722), the processing proceeds to step S723.

In step S723, the CPU 301 determines whether a return button 844 has been pressed on the analysis permission fixed message screen 840. In a case where the return button 844 has been pressed (YES in step S723), the processing returns to step S711. In a case where the return button 844 has not been pressed (NO in step S723), the processing returns to step S715.

In step S724, the CPU 301 controls the display unit 307 to display an analysis permission message agreement reception screen 870.

In step S725, the CPU 301 determines whether an "agree" button 871 has been pressed on the analysis permission message agreement reception screen 870. The CPU 301 receives an operation representing user agreement with an analysis permission matter indicating that the user permits the transmission of information from the image processing apparatus 105 to the service providing server unit (transmission destination) 101. In a case where the "agree" button 871 has been pressed (YES in step S725), the processing proceeds to step S726. In a case where the "agree" button 871 has not been pressed (NO in step S725), the processing proceeds to step S727.

In step S726, the CPU 301 stores information indicating that the user has agreed with a service permission message and agreed with an analysis permission message, and information indicating the version of the permission set that has been acquired from the server 102 or 103, into the management information of a permission state in the nonvolatile memory 309, and ends the permission reception screen processing. That is, the information indicating that the user has agreed with a service permission message and agreed with an analysis permission message is stored in association with the information indicating the updated version of the latest permission set in the installation region.

In step S727, the CPU 301 determines whether a "disagree" button 872 has been pressed on the analysis permission message agreement reception screen 870. In a case where the "disagree" button 872 has been pressed (YES in step S727), the processing proceeds to step S728. In a case where the "disagree" button 872 has not been pressed (NO in step S727), the processing proceeds to step S729.

In step S728, the CPU 301 stores information indicating that the user has agreed with a service permission message and disagreed (ungranted) with an analysis permission message, and information indicating the version of the permission set that has been acquired from the server 102 or 103, into the management information of a permission state in the nonvolatile memory 309. After that, the CPU 301 ends the permission reception screen processing.

In step S729, the CPU 301 determines whether a return button 873 has been pressed on the analysis permission message agreement reception screen 870. In a case where the return button 873 has been pressed (YES in step S729), the processing returns to step S714. In a case where the return button 873 has not been pressed (NO in step S729), the processing returns to step S725.

In step S734, the CPU 301 determines whether a return button 833 has been pressed on the service permission message agreement reception screen 830. In a case where the return button 833 has been pressed (YES in step S734), the processing returns to step S702. In a case where the return button 833 has not been pressed (NO in step S734), the processing returns to step S712.

In step S730, the CPU 301 controls the display unit 307 to display a service permission ungranted confirmation screen 880.

In step S731, the CPU 301 determines whether a Yes button 881 has been pressed on the service permission ungranted confirmation screen 880. In a case where the Yes button 881 has been pressed (YES in step S731), the processing proceeds to step S732. In a case where the Yes button 881 has not been pressed (NO in step S731), the processing proceeds to step S733.

In step S732, the CPU 301 stores information indicating that the user has disagreed (ungranted) with a service permission message and disagreed (ungranted) with an analysis permission message, and information indicating the version of the permission set that has been acquired from the server 102 or 103, into the management information of a permission state in the nonvolatile memory 309. After that, the CPU 301 ends the permission reception screen processing.

In step S733, the CPU 301 determines whether a No button 882 or a return button 883 has been pressed on the service permission ungranted confirmation screen 880. In a case where the No button 882 or the return button 883 has been pressed (YES in step S733), the processing returns to step S711. In a case where the No button 882 or the return button 883 has not been pressed (NO in step S733), the processing returns to step S731.

From when the permission reception screen processing has started in step S701 of FIG. 7A, to when the processing ends in step S726, S728 or S732, a screen other than the screens related to permission guidance that are illustrated in FIG. 8 may be made undisplayable.

In a case where a permission matter in a permission fixed message stored in the image processing apparatus 105 is sufficient, a URL for accessing the web server 104 may be made undisplayable. Specifically, the detail buttons 802 and 842 on the service permission fixed message screen 800 and the analysis permission fixed message screen 840 are deleted, and screen transition to the screens 810 and 850 that display a URL for accessing the web server 104 is made inexecutable.

In steps S705 and S717, destination information and display language information are added as a query parameter to the URL for accessing the web server 104, but another type of information that enables the web server 104 to select an appropriate permission message may be added. Specifically, the examples of the information include sendable permission versions of the service permission and the analysis permission, and region information indicating a connection destination country where the image processing apparatus 105 connects to the service providing server unit 101. To avoid asking for agreement with a permission item unnecessary for the user, information that enables the web server 104 to recognize a service available to the image processing apparatus 105 may be added as a query parameter. Specifically, examples of the information include information regarding functions of the image processing apparatus 105.

In a case where the display unit 307 displays a permission message, due to restrictions on the display on the display unit 307 (restrictions on the size, the resolution, and the number of characters that can be displayed at a time that is attributed to a UI design of an embedded device), a long character string sometimes fails to be correctly displayed or fails to be displayed with good visibility. In contrast to this, according to the present embodiment, it is possible to prompt the user to check a permission message by displaying the permission message on a display unit (display) of the mobile terminal 106 expected to have less restriction (higher performance) than the display unit 307 of the image processing apparatus 105. The user can accordingly check a character string of a correct permission message even if the character string is long, without being subjected to restrictions such as restrictions on the number of characters. The user can also check a character string of a permission message with good visibility. The user can therefore accurately understand a permission message and select whether to agree with the permission message. A permission message that is based on the installation region of the image processing apparatus 105 and the display language is automatically displayed on the mobile terminal 106. Thus, it is possible to save the user the trouble of selecting the installation region of the image processing apparatus 105 and selecting the display language, and the user can check a permission message complying with the law of the installation region of the image processing apparatus 105.

The above-described various types of control to be performed by the image processing apparatus 105 may be performed by a single hardware component, or a plurality of hardware components (e.g., a plurality of processor or circuits) may control the entire image processing apparatus 105 by sharing processing.

Embodiments of the present invention have been described in detail, but the present invention is not limited to these specific embodiments. Various configurations that do not depart from the gist of the invention are also included in the present invention. Furthermore, each of the above-described embodiments merely indicates an embodiment of the present invention, and the embodiments can also be appropriately combined.

In each of the above-described embodiments, the description has been given of an example case where the present invention is applied to an image processing apparatus, but this is not limited to this example. The present invention can be applied to an electronic device as long as the electronic device is an electronic device that transmits user information to a server. More specifically, the present invention can be applied to a personal computer, a personal digital assistance (PDA), a mobile phone terminal, a portable image viewer, a printer apparatus including a display, a digital photo frame, a music player, a game machine, and an electronic book reader.

The present invention can also be implemented by the following processing. More specifically, the processing is processing of supplying a program implementing the function of the above-described embodiment, to a system or an apparatus via a network or various recording media, and at least one computer (or CPU or a micro processing unit (MPU) of the system or the apparatus reading out and executing a program code. In this case, the program and a computer-readable recording medium on which the program is recorded are included in the present invention.

According to an aspect of the present disclosure, processing requiring user permission can be performed more appropriately.

According to another aspect of the present disclosure, processing of acquiring user permission can be performed more easily and appropriately.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Applications No. 2023-149260, filed Sep. 14, 2023, and No. 2023-149261, filed Sep. 14, 2023, which are hereby incorporated by reference herein in their entirety.

What is claimed is:

1. An electronic device comprising:

at least one memory and at least one processor and/or at least one circuit which function as:

a processing unit configured to perform processing in such a manner that a permission state indicating whether an operation representing user agreement with a permission matter regarding transmission of information from the electronic device to a transmission destination has been received is stored in a storage unit;

an acquisition unit configured to acquire first information indicating whether the permission matter that corresponds to a region of the electronic device has been updated from an external device; and a control unit configured to, in a case where the permission state indicates that an operation representing agreement has been received, and in a case where an acquisition status in the acquisition unit is not a status indicating that an update has been executed, perform control to transmit information to the transmission destination without displaying a reception screen for receiving agreement with the permission matter from a user after acquisition of the first information, and in a case where the permission state indicates that an operation representing agreement has been received, and in a case where an acquisition status in the acquisition unit is a status indicating that update has been executed, perform control to display the reception screen for receiving agreement with the updated permission matter from a user after acquisition of the first information and before transmission of information to the transmission destination is performed.

2. The electronic device according to claim 1, wherein, if connection with a network to which the external device is connectable is established, the acquisition unit acquires the first information irrespective of whether a specific event requiring transmission of information to the transmission destination to be performed has occurred, and wherein, if the specific event occurs, the control unit performs control that is based on the first information acquired before occurrence of the specific event.

3. The electronic device according to claim 1, wherein, in a case where the permission state indicates that an operation representing agreement has been received, the acquisition unit acquires the first information from the external device in response to occurrence of a specific event requiring transmission of information to the transmission destination to be performed and wherein the control unit performs control that is based on the first information acquired in response to occurrence of the specific event.

4. The electronic device according to claim 1, wherein, in a case where the permission state indicates that an operation representing agreement has been received, and in a case where the first information acquired by the acquisition unit is information indicating that update has been executed, the control unit performs control to display at least one of the information indicating that the update has been executed, and information indicating that the reception screen is reception of permission again when displaying the reception screen.

5. The electronic device according to claim 1, wherein, if an operation representing agreement is received on the reception screen, the control unit then performs control to transmit information to the transmission destination.

6. The electronic device according to claim 1, wherein the acquisition unit transmits information regarding a destination region of the electronic device, to the external device, and acquires the first information corresponding to the destination region, from the external device.

7. The electronic device according to claim 1, wherein a permission state to be stored in the storage unit includes information indicating whether an operation representing user permission for transmission of information regarding the electronic device from the electronic device to the transmission destination via an internet has been received.

8. The electronic device according to claim 7, wherein a permission state to be stored in the storage unit includes information indicating whether an operation representing user permission for transmission of information regarding a service use from the electronic device to the transmission destination via an internet has been received, and information indicating whether an operation representing user permission for transmission of information regarding a usage situation of the electronic device from the electronic device to the transmission destination via an internet has been received.

9. The electronic device according to claim 1, wherein, if an operation representing agreement is received on the reception screen, the processing unit performs processing in such a manner that permission information indicating that an operation representing user agreement has been received is stored in association with an updated permission matter.

10. The electronic device according to claim 1, wherein, in a case where the permission state is a permission state indicating that the operation representing the user agreement has been received, the processing unit performs processing in such a manner that information making a version of the permission matter identifiable is stored.

11. The electronic device according to claim 10, wherein the first information is information making a latest version of a permission matter identifiable, and wherein, in a case where the first information is different from the stored information making a version of the permission matter identifiable, the control unit determines that the first information is information indicating that update has been executed.

12. The electronic device according to claim 1, wherein, in a case where the first information is information indicating that update has been executed, the control unit acquires information indicating a latest version of a permission matter, from the external device.

13. The electronic device according to claim 1, wherein the permission matter is a permission text.

14. The electronic device according to claim 13, wherein the permission text is stored in a server, and updated in response to function addition or law amendment.

15. The electronic device according to claim 1, wherein the electronic device is a printer that can execute print processing.

16. A method for controlling an electronic device, the method comprising:

performing processing in such a manner that a permission state indicating whether an operation representing user agreement with a permission matter regarding transmission of information from the electronic device to a transmission destination has been received is stored;

acquiring first information indicating whether the permission matter that corresponds to a region of the electronic device has been updated, from an external device;

in a case where the permission state indicates that an operation representing agreement has been received, and in a case where an acquisition status in the acquiring is not a status indicating that an update has been executed, performing control to, in first control, transmit information to the transmission destination without displaying a reception screen for receiving agreement with the permission matter from a user after acquisition of the first information; and in a case where the permission state indicates that an operation representing agreement has been received, and in a case where an acquisition status in the acquiring is a status indicating that update has been executed, performing control to, in second control, display the reception screen for receiving agreement with the updated permission matter from a user after acquisition of the first information and before transmission of information to the transmission destination is performed.

17. A non-transitory computer-readable storage medium storing one or more programs for executing a method for controlling an electronic device, the method comprising:

performing processing in such a manner that a permission state indicating whether an operation representing user agreement with a permission matter regarding transmission of information from the electronic device to a transmission destination has been received is stored;

acquiring first information indicating whether the permission matter that corresponds to a region of the electronic device has been updated, from an external device;

in a case where the permission state indicates that an operation representing agreement has been received, and in a case where an acquisition status in the acquiring is not a status indicating that an update has been executed, performing control to, in first control, transmit information to the transmission destination without displaying a reception screen for receiving agreement with the permission matter from a user after acquisition of the first information; and in a case where the permission state indicates that an operation representing agreement has been received, and in a case where an acquisition status in the acquiring is a status indicating that update has been executed, performing control to, in second control, display the reception screen for receiving agreement with the updated permission matter from a user after acquisition of the first information and before transmission of information to the transmission destination is performed.

18. An electronic device comprising:

a display;

a storage; and at least one memory and at least one processor and/or at least one circuit which function as:

a reception unit configured to receive an operation representing user agreement with a permission matter regarding transmission of information from the electronic device to a transmission destination; and a display control unit configured to perform control to display, on the display, information indicating a uniform resource locator (URL) that is a URL for displaying a permission matter stored in a server, and is a URL to which additional information making identifiable a region where the electronic device is installed, based on information stored in the storage, is added.

19. The electronic device according to claim 18, wherein the display control unit performs control in such a manner as to display information indicating a URL to which additional information indicating a setting of a display language is further added, as the URL.

20. The electronic device according to claim 18, wherein the additional information is a URL parameter.

21. The electronic device according to claim 18, wherein the display control unit performs control in such a manner as to display the information indicating the URL, as a code image.

22. The electronic device according to claim 18, wherein, if a different device accesses the displayed information indicating the URL, a permission matter corresponding to the region is automatically displayed.

23. The electronic device according to claim 18, wherein the additional information making a region identifiable is information that is based on destination information stored in the storage from a factory default state of the electronic device.

24. The electronic device according to claim 18, wherein the display control unit performs control in such a manner as to display, information indicating a URL to which information indicating at least a part of an internet protocol (IP) address dynamically allocated to the electronic device is added as the additional information making a region identifiable.

25. The electronic device according to claim 18, wherein, in a case where a permission matter that is stored in the server and to obtain agreement from a user is same as a permission matter stored in the storage, the display control unit performs control in such a manner as not to display the information indicating the URL.

26. The electronic device according to claim 18, wherein the at least one memory and the at least one processor and/or the at least one circuit further function as a first obtaining unit configured to obtain second information indicating a version of a permission matter to obtain agreement, from an external device, and wherein the display control unit performs control in such a manner as to display information indicating a URL to which additional information indicating a version obtained by the obtaining unit is further added, as the URL.

27. The electronic device according to claim 18, wherein the storage stores a permission state indicating whether an operation representing user agreement with the permission matter has been received, and wherein the at least one memory and the at least one processor and/or the at least one circuit further function as:

an acquisition unit configured to, in a case where the permission state indicates that an operation representing agreement has been received, acquire first information for determining whether a permission matter to obtain agreement has been updated, from an external device; and a control unit configured to, in a case where the first information acquired by the acquisition unit is not information indicating that an update has been executed, perform control to transmit information to the transmission destination without displaying a reception screen for receiving agreement with the permission matter from a user after acquisition of the first information, and in a case where the first information acquired by the acquisition unit is information indicating that update has been executed, perform control to display the reception screen for receiving agreement with the updated permission matter from a user after acquisition of the first information and before transmission of information to the transmission destination is performed.

28. The electronic device according to claim 27, wherein the display control unit performs control to display the information indicating the URL, on the reception screen.

29. A method for controlling an electronic device including a display and a storage, the method comprising:

receiving an operation representing user agreement with a permission matter regarding transmission of information from the electronic device to a transmission destination; and performing control to display, on the display, information indicating a uniform resource locator (URL) that is a URL for displaying a permission matter stored in a server, and is a URL to which additional information making identifiable a region where the electronic device is installed, based on information stored in the storage, is added.

30. A non-transitory computer-readable storage medium storing one or more programs for executing a method for controlling an electronic device including a display and a storage, the method comprising:

receiving an operation representing user agreement with a permission matter regarding transmission of information from the electronic device to a transmission destination; and performing control to display, on the display, information indicating a uniform resource locator (URL) that is a URL for displaying a permission matter stored in a server, and is a URL to which additional information making identifiable a region where the electronic device is installed, based on information stored in the storage, is added.

* * * * *